United States Patent
Song et al.

(10) Patent No.: US 10,164,479 B2
(45) Date of Patent: Dec. 25, 2018

(54) WIRELESS POWER TRANSMITTER AND METHOD FOR CONTROLLING WIRELESS POWER TRANSMITTER

(71) Applicant: Samsung Electronics Co., Ltd., Gyeonggi-do (KR)

(72) Inventors: Keum-Su Song, Seoul (KR); Kyung-Woo Lee, Seoul (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 137 days.

(21) Appl. No.: 15/120,693

(22) PCT Filed: Feb. 13, 2015

(86) PCT No.: PCT/KR2015/001476
§ 371 (c)(1),
(2) Date: Aug. 22, 2016

(87) PCT Pub. No.: WO2015/126103
PCT Pub. Date: Aug. 27, 2015

(65) Prior Publication Data
US 2017/0025903 A1    Jan. 26, 2017

(30) Foreign Application Priority Data

Feb. 20, 2014 (KR) .......... 10-2014-0019940
Feb. 12, 2015 (KR) .......... 10-2015-0021856

(51) Int. Cl.
*H02J 50/40* (2016.01)
*H02J 50/80* (2016.01)
(Continued)

(52) U.S. Cl.
CPC .............. *H02J 50/40* (2016.02); *H02J 7/025* (2013.01); *H02J 50/12* (2016.02); *H02J 50/80* (2016.02);
(Continued)

(58) Field of Classification Search
CPC .. H02J 17/00; H02J 50/40; H02J 50/80; H02J 50/12; H02J 7/025; H04B 1/38; H04B 5/0031; H04B 5/0037
See application file for complete search history.

(56) References Cited

U.S. PATENT DOCUMENTS

2006/0050798 A1  3/2006  Odigie et al.
2011/0031928 A1  2/2011  Soar
(Continued)

FOREIGN PATENT DOCUMENTS

| JP | 2012050321 | 3/2012 |
| KR | 1020120061085 | 6/2012 |
| KR | 1020140007237 | 1/2014 |

OTHER PUBLICATIONS

PCT/ISA/210 Search Report dated PCT/KR2015/001476 (pp. 4).
PCT/ISA/237 Written Opinion dated PCT/KR2015/001476 (pp. 6).

*Primary Examiner* — Robert Deberadinis
(74) *Attorney, Agent, or Firm* — The Farrell Law Firm, P.C.

(57) ABSTRACT

Provided is a method for controlling a wireless power transmitter transmitting wireless power to at least one wireless power receiver. The method for controlling a wireless power transmitter, according to the present invention, can comprise the steps of: receiving information related to a wireless power receiver from at least one of each of the wireless power receiver; and controlling each of a plurality of power transmitting units included in the wireless power transmitter on the basis of the information related to the wireless power receiver.

17 Claims, 16 Drawing Sheets

(51) Int. Cl.
*H02J 50/12* (2016.01)
*H02J 7/02* (2016.01)
*H04B 5/00* (2006.01)

(52) U.S. Cl.
CPC ......... *H04B 5/0031* (2013.01); *H04B 5/0037* (2013.01)

(56) References Cited

U.S. PATENT DOCUMENTS

| | | |
|---|---|---|
| 2012/0025627 A1 | 2/2012 | Shionoiri et al. |
| 2012/0126745 A1 | 5/2012 | Partovi et al. |
| 2012/0217111 A1 | 8/2012 | Boys et al. |
| 2012/0244822 A1* | 9/2012 | Kim ................ H02J 5/005 455/90.1 |
| 2014/0009110 A1 | 1/2014 | Lee et al. |

* cited by examiner

WIRELESS POWER TRANSMITTER AND METHOD FOR CONTROLLING WIRELESS POWER TRANSMITTER

PRIORITY

This application is a National Phase Entry of PCT International Application No. PCT/KR2015/001476, which was filed on Feb. 13, 2015, and claims priority to Korean Patent Application No. 10-2014-0019940, which was filed on Feb. 20, 2014, and Korean Patent Application No. 10-2015-0021856, which was filed on Feb. 12, 2015, the contents of each of which are incorporated herein by reference.

TECHNICAL FIELD

The present invention relates to a wireless power transmitter and a control method thereof, and more particularly, to a wireless power transmitter capable of performing communication according to a predetermined scheme and a control method thereof.

BACKGROUND ART

Mobile terminals such as mobile phones, Personal Digital Assistants (PDAs), and the like are powered by rechargeable batteries. The battery of the mobile terminal is charged with electrical energy by a separate charging device. Typically, a separate contact terminal is formed on the outer side of each of the charging device and the battery, and the charging device and the battery are electrically connected to each other through contact between the two separate contact terminals.

However, in such a contact-type charging scheme, the contact terminals protrude outwardly, and thus are easily contaminated by foreign substances. As a result, battery charging is not correctly performed. Further, battery charging may not be correctly performed when the contact terminals are exposed to moisture.

In order to solve the above-mentioned problems, a wireless charging technology or a non-contact charging technology has recently been developed and used in many electronic devices.

The wireless charging technology uses wireless power transmission and reception, and corresponds to, for example, a system in which a battery is automatically charged if the battery is just put on a charging pad without connecting the mobile phone to a separate charging connector. Typically, the wireless charging technology is generally known to be used in wireless electric toothbrushes or wireless electric shavers. The wireless charging technology can improve a waterproof function because it can be used to wirelessly charge the electronic devices. The wireless charging technology can improve the portability of the electronic devices because it does not require a wired charger. Therefore, it is expected that technologies related to the wireless charging technology will be significantly developed in the coming age of electric cars.

The wireless charging technology largely includes an electromagnetic induction scheme using a coil, a resonance scheme using resonance, and a Radio Frequency (RF)/microwave radiation scheme for converting electrical energy into a microwave and transmitting the microwave.

Until now, the wireless charging technology using the electromagnetic induction scheme has been the mainstream technology. However, recently, experiments in which power is wirelessly transmitted over a distance of several tens of meters by using microwaves have been successful at home and abroad. Accordingly, it is expected that an environment in which all electronic devices can be wirelessly charged at anytime and anywhere will be realized in the near future.

A power transmission method using electromagnetic induction corresponds to a scheme for transmitting power between a primary coil and a secondary coil. When a magnet approaches the coil, an induced current is generated. A transmission side generates a magnetic field by using the induction current, and a reception side generates electrical energy by inducing a current according to a change in the magnetic field. This phenomenon is called a magnetic induction phenomenon, and the power transmission method using this phenomenon has excellent energy transmission efficiency.

With respect to the resonance scheme, in 2005, Professor Soljacic of the Massachusetts Institute of Technology (MIT) published a report on a system in which electricity is wirelessly transferred from a charging device to a device to be charged by using a power transmission principle of the resonance scheme known as a coupled mode theory even when the device to be charged is several meters away from the charging device. A wireless charging system of the MIT research team employs the physics concept called "resonance" in which when a tuning fork oscillates at a particular frequency, a wine glass next to the tuning fork will oscillate at the same frequency. The MIT research team caused an electromagnetic wave containing electrical energy to resonate instead of causing sound to resonate. It is known that the resonant electrical energy does not affect surrounding machines and human bodies differently from other electromagnetic waves because the resonant electrical energy is directly transferred only to a device having a resonance frequency and its unused part is reabsorbed into an electromagnetic field instead of spreading into the air.

Meanwhile, these days, research on a wireless charging method has been actively being conducted, but standards for a wireless charging order, a search for a wireless power transmitter/receiver, selection of a communication frequency between the wireless power transmitter and the wireless power receiver, adjustment of wireless power, selection of a matching circuit, and communication time distribution for each wireless power receiver in one charging cycle, and the like, have not been proposed. Particularly, it is required to propose a standard for a configuration and a procedure in which the wireless power receiver selects the wireless power transmitter from which the wireless power receiver is to receive wireless power.

The wireless power transmitter and the wireless power receiver may communicate with each other on the basis of a predetermined scheme (e.g., a Zigbee scheme or a Bluetooth low energy scheme). An out-band scheme, such as the Zigbee scheme or the Bluetooth low energy scheme, allows an available distance of communication to increase. Accordingly, even when the wireless power transmitter and the wireless power receiver are placed such that the distance therebetween is relatively long, the wireless power transmitter and the wireless power receiver can communicate with each other. Specifically, even when the wireless power transmitter is located at such a relatively long distance from the wireless power receiver that the wireless power transmitter cannot transmit wireless power to the wireless power receiver, the wireless power transmitter can communicate with the wireless power receiver.

DETAILED DESCRIPTION OF THE INVENTION

Technical Problem

A conventional wireless power transmitter includes a resonator included in a particular class. A class may be a classification criterion for the amount of power transmitted by a wireless power transmitter, and the wireless power transmitter may include a resonator included in one class. Meanwhile, a resonator included in a relatively large class transmits relatively large wireless power. In this respect, even when a wireless power receiver included in a relatively small category is placed on the wireless power transmitter, the wireless power transmitter transmits relatively large wireless power to the wireless power receiver, and thus a problem occurs in that power is wasted.

The present invention has been devised to solve the above-mentioned problems or other problems, and can provide a wireless power transmitter including multiple power transmission units and a control method thereof.

Technical Solution

In accordance with an aspect of the present invention, a control method of a wireless power transmitter for transmitting wireless power to at least one wireless power receiver is provided. The control method may include receiving information related to the wireless power receiver, from each of the at least one wireless power receiver; and controlling each of multiple power transmission units included in the wireless power transmitter based on the information related to the wireless power receiver.

In accordance with another aspect of the present invention, a wireless power transmitter for transmitting wireless power to at least one wireless power receiver is provided. The wireless power transmitter may include multiple power transmission units; a communication unit that receives information related to the wireless power receiver, from each of the at least one wireless power receiver; and a control unit that controls each of the multiple power transmission units based on the information related to the wireless power receiver.

Advantageous Effects

According to various embodiments of the present invention, a wireless power transmitter including multiple power transmission units can be provided. Accordingly, a power transmission unit belonging to a low power class can be implemented in the form of being simply attached to the wireless power transmitter, and thus can be simply manufactured. Also, wireless power receivers in various forms may perform charging with good efficiency. Further, power transmission units of various classes can be included, and thus the effect of a reduction in wasted power can be produced.

MODE FOR CARRYING OUT THE INVENTION

Figure 1:
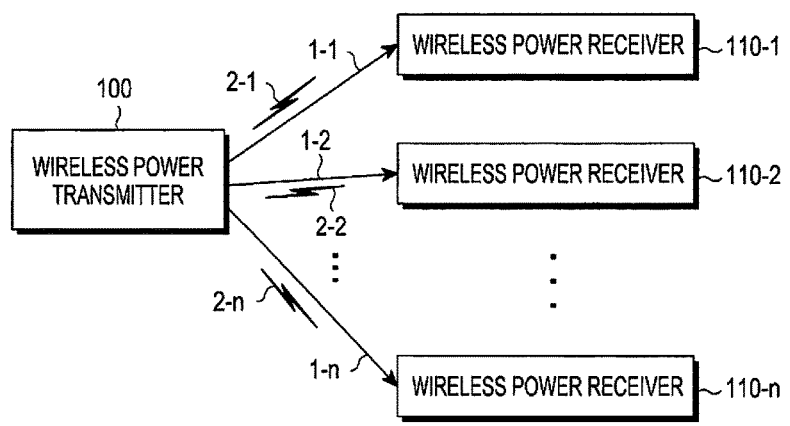
FIG. 1 is a conceptual view illustrating an overall operation of a wireless charging system.

Hereinafter, exemplary embodiments of the present invention will be described in more detail with reference to the accompanying drawings. It should be noted that the same elements in the accompanying drawings will be designated by the same reference numerals wherever possible. A detailed description of known functions and configurations, which may unnecessarily obscure the subject matter of the present invention, will be omitted in the following description and the accompanying drawings.

First, a concept of a wireless charging system, which may be applied to embodiments of the present invention, will be described with reference to FIG. 1 to FIG. 11, and then, a wireless power transmitter according to various embodiments of the present invention will be described in detail with reference to FIG. 12 to FIG. 17.

FIG. 1 is a conceptual view illustrating an overall operation of a wireless charging system. Referring to FIG. 1, the wireless charging system includes a wireless power transmitter 100 and one or more wireless power receivers 110-1, 110-2, . . . , and 110-$n$.

The wireless power transmitter 100 may wirelessly transmit power 1-1, power 1-2, . . . , and power 1-$n$ to the one or more wireless power receivers 110-1, 110-2, . . . , and 110-$n$, respectively. More specifically, the wireless power transmitter 100 may wirelessly transmit power 1-1, power 1-2, . . . , and power 1-$n$ to only the wireless power receivers authenticated after going through a predetermined authentication procedure.

The wireless power transmitter 100 may form an electrical connection to the wireless power receivers 110-1, 110-2, . . . , and 110-$n$. For example, the wireless power transmitter 100 may transmit wireless power having a form of an electromagnetic wave to each of the wireless power receivers 110-1, 110-2, . . . , and 110-$n$.

Meanwhile, the wireless power transmitter 100 may perform bidirectional communication with the wireless power receivers 110-1, 110-2, . . . , and 110-$n$. Here, the wireless power transmitter 100 and the wireless power receivers 110-1, 110-2, . . . , and 110-$n$ may process or transmit and receive packets 2-1, 2-2, . . . , and 2-$n$ each including predetermined frames. The above-described frame will be described in more detail below. Particularly, the wireless power receiver may be implemented by using a mobile communication terminal, a PDA, a Personal Media Player (PMP), a smart phone, or the like.

The wireless power transmitter 100 may wirelessly provide power to the multiple wireless power receivers 110-1, 110-2, . . . , and 110-$n$. For example, the wireless power transmitter 100 may transmit power to the multiple wireless power receivers 110-1, 110-2, . . . , and 110-$n$ in the resonance scheme. When the wireless power transmitter 100 employs the resonance scheme, it is desirable that a distance between the wireless power transmitter 100 and the multiple wireless power receivers 110-1, 110-2, . . . , and 1110-$n$ may be less than or equal to 30 m. Alternatively, when the wireless power transmitter 100 employs the electromagnetic induction scheme, it is desirable that a distance between the wireless power transmitter 100 and the multiple wireless power receivers 110-1, 110-2, . . . , and 110-$n$ may be less than or equal to 10 cm.

Each of the wireless power receivers 110-1, 110-2, . . . , and 1110-$n$ may receive wireless power from the wireless power transmitter 100 and may charge a battery included therein. Also, each of the wireless power receivers 110-1, 110-2, . . . , and 1110-$n$ may transmit, to the wireless power transmitter 100, a signal for requesting the transmission of wireless power, information required to receive wireless power, state information of a wireless power receiver, or control information required by the wireless power transmitter 100. Information of the signal transmitted to the wireless power transmitter 100 will be described in more detail below.

Also, each of the wireless power receivers 110-1, 110-2, . . . , and 1110-$n$ may transmit a message indicating a charging status thereof to the wireless power transmitter 100.

The wireless power transmitter 100 may include a display means such as a display unit, and may display a state of each of the wireless power receivers 110-1, 110-2, . . . , and 1110-$n$ based on a message received from each of the wireless power receivers 110-1, 110-2, . . . , and 1110-$n$. Also, the wireless power transmitter 100 may display an expected time period until the charging of each of the wireless power receivers 110-1, 110-2, . . . , and 1110-$n$ is completed, together with the state of each of the wireless power receivers 110-1, 110-2, . . . , and 1110-$n$.

The wireless power transmitter 100 may transmit a control signal for disabling a wireless charging function of each of the wireless power receivers 110-1, 110-2, . . . , and 1110-$n$. The wireless power receiver which has received the control signal for disabling the wireless charging function from the wireless power transmitter 100, may disable the wireless charging function thereof.

Figure 2:
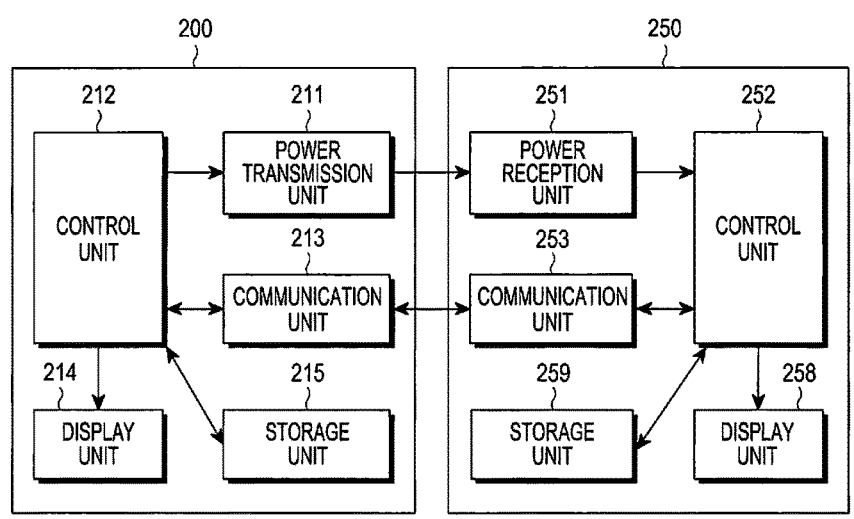
FIG. 2 illustrates examples of a wireless power transmitter and a wireless power receiver according to an embodiment of the present invention.

FIG. 2 illustrates examples of a wireless power transmitter and a wireless power receiver according to an embodiment of the present invention.

As illustrated in FIG. 2, the wireless power transmitter 200 may include at least one of a power transmission unit 211, a control unit 212, a communication unit 213, a display unit 214, and a storage unit 215.

The power transmission unit 211 may provide power that the wireless power transmitter 200 requires, and may wirelessly provide power to the wireless power receiver 250. Here, the power transmission unit 211 may supply power in the form of Alternating Current (AC). Alternatively, the power transmission unit 211 may convert the power in the form of Direct Current (DC) into power in the form of AC by using an inverter and may supply the power in the form of AC. The power transmission unit 211 may be implemented in the form of a built-in battery. Alternatively, the power transmission unit 211 may be implemented in the form of an interface for receiving power, and may serve to receive power from the outside and supply the received power to elements other than itself. Those skilled in the art will easily understand that the power transmission unit 211 is not limited if it corresponds to any means capable of providing power having an AC waveform.

The control unit 212 may control an overall operation of the wireless power transmitter 200. The control unit 212 may control the overall operation of the wireless power transmitter 200 by using an algorithm, a program or an application, which is read from a storage unit 215 and is required for control. The control unit 212 may be implemented in the form of a Central Processing Unit (CPU), a microprocessor, a minicomputer, or the like.

The communication unit 213 may communicate with the wireless power receiver 250 by using a predetermined scheme. The communication unit 213 may receive power information from the wireless power receiver 250. Here, the power information may include at least one of capacity, battery residual quantity, the number of times of charging, usage, battery capacity, and battery charge/consumption ratio of the wireless power receiver 250.

Also, the communication unit 213 may transmit a charging function control signal for controlling a charging function of the wireless power receiver 250. The charging function control signal may be a control signal which controls the wireless power reception unit 251 of the particular wireless power receiver 250 to enable or disable the charging function of the particular wireless power receiver 250. Alternatively, as described in more detail below, the power information may include information on, for example, insertion of a wired charging terminal, transition from a Stand Alone (SA) mode to a Non Stand Alone (NSA) mode, release from an error situation, etc. Also, the charging function control signal may be information related to the determination of a cross-connection according to various embodiments of the present invention. For example, the charging function control signal may include identification information, configuration information, and the like for determining the cross-connection, and may include pattern information or time information related to a load change of the wireless power receiver 250 for determining the cross-connection.

The communication unit 213 may receive signals from another wireless power transmitter (not illustrated) as well as from the wireless power receiver 250.

The control unit 212 may display the state of the wireless power receiver 250 on the display unit 214 on the basis of a message received from the wireless power receiver 250 through the communication unit 213. Also, the control unit 212 may display, on the display unit 214, an expected time period until the wireless power receiver 250 is completely charged.

Also, as illustrated in FIG. 2, the wireless power receiver 250 may include at least one of a power reception unit 251, a control unit 252, a communication unit 253, a display unit 258, and a storage unit 259.

The power reception unit 251 may wirelessly receive power transmitted by the wireless power transmitter 200. Here, the power reception unit 251 may receive power in the form of AC.

The control unit 252 may control an overall operation of the wireless power receiver 250. The control unit 252 may control the overall operation of the wireless power receiver 250 by using an algorithm, a program or an application, which is read from a storage unit 259 and is required for control. The control unit 252 may be implemented in the form of a CPU, a microprocessor, a minicomputer, or the like.

The communication unit 253 may communicate with the wireless power transmitter 200 by using a predetermined scheme. The communication unit 253 may transmit power information to the wireless power transmitter 200. Here, the power information may include at least one of capacity, battery residual quantity, the number of times of charging, usage, battery capacity, and battery charge/consumption ratio of the wireless power receiver 250.

Also, the communication unit 253 may transmit a charging function control signal for controlling a charging function of the wireless power receiver 250. The charging function control signal may be a control signal which controls the wireless power reception unit 251 of the particular wireless power receiver 250 to enable or disable the charging function of the particular wireless power receiver 250. Alternatively, as described in more detail below, the power information may include information on, for example, insertion of a wired charging terminal, transition from a Stand Alone (SA) mode to a Non Stand Alone (NSA) mode, release from an error situation, etc. Also, the charging function control signal may be information related to the determination of a cross-connection according to various embodiments of the present invention. For example, the charging function control signal may include identification information, configuration information, and the like for determining the cross-connection, and may include pattern information or time information related to a load change of the wireless power receiver 250 for determining the cross-connection.

The control unit 252 may control the display unit 258 to display the state of the wireless power receiver 250. Also, the control unit 252 may display, on the display unit 258, an expected time period until the wireless power receiver 250 is completely charged.

Figure 3:
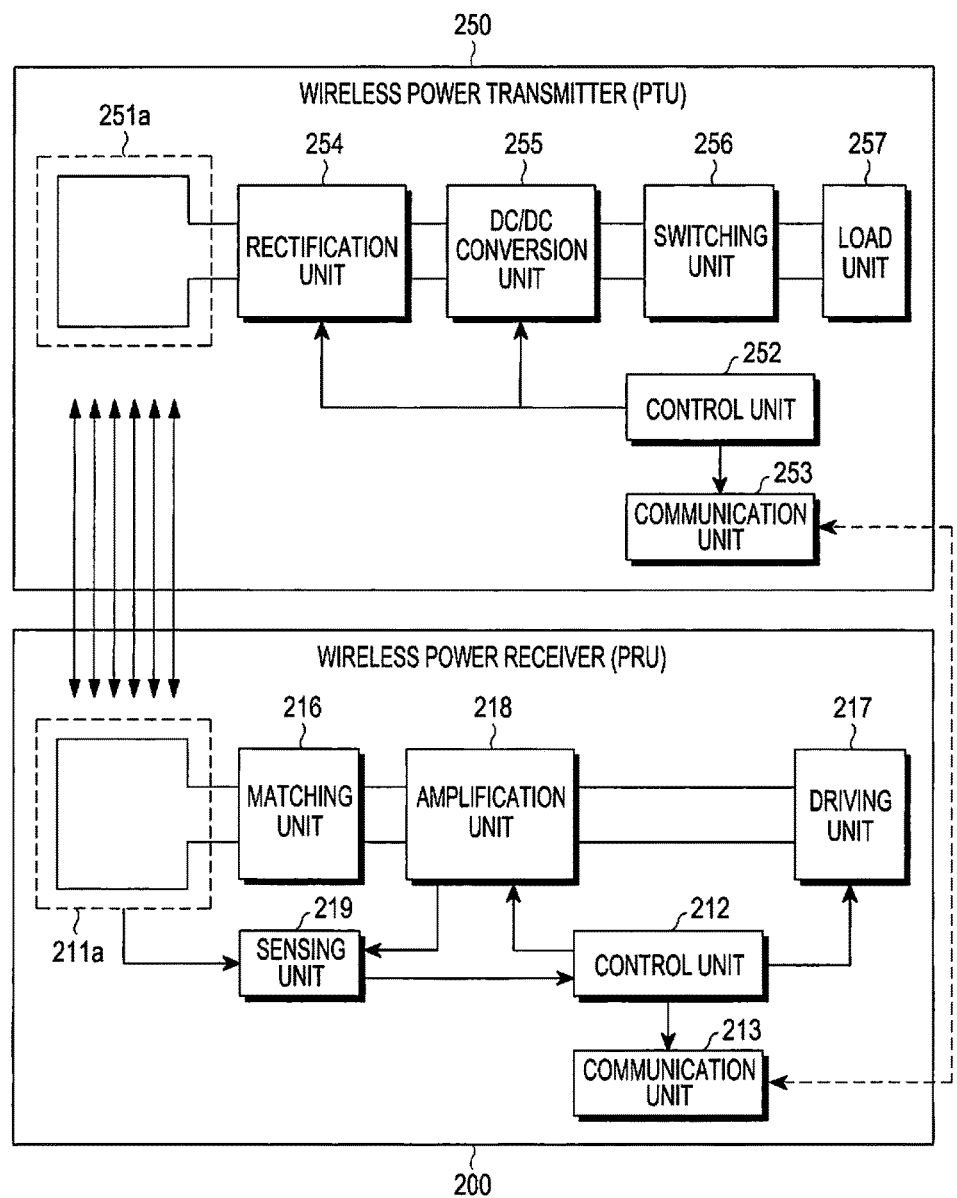
FIG. 3 is a detailed block diagram illustrating a wireless power transmitter and a wireless power receiver according to an embodiment of the present invention.

FIG. 3 is a detailed block diagram illustrating a wireless power transmitter and a wireless power receiver according to an embodiment of the present invention.

As illustrated in FIG. 3, the wireless power transmitter 200 may include at least one of a Tx resonance unit (a Tx resonator) 211a, a control unit (e.g., an MCU) 212, a communication unit (e.g., an out-of-band signaling unit) 213, a driving unit (a power supply) 217, an amplification unit (a power amp) 218, a matching unit (a matching circuit) 216, and a sensing unit 219. The wireless power receiver 250 may include at least one of an Rx resonance unit (an Rx resonator) 251a, a control unit 252, a communication unit 253, a rectification unit (a rectifier) 254, a DC/DC conversion unit 255, a switching unit (a switch) 256, and a load unit (a client device load) 257.

The driving unit 217 may output DC power having a preset voltage value. The voltage value of the DC power output by the driving unit 217 may be controlled by the control unit 212.

A DC current output from the driving unit 217 may be output to the amplification unit 218. The amplification unit 218 may amplify the DC current by a preset gain. Also, the amplification unit 218 may convert DC power into AC power on the basis of a signal input from the control unit 212. Accordingly, the amplification unit 218 may output AC power.

The matching unit 216 may perform impedance matching. For example, the matching unit 216 may adjust an impedance seen from the matching unit 216 and may control output power to have high efficiency or high output. The sensing unit 219 may sense a load change caused by the wireless power receiver 250 through the Tx resonance unit 211a or the amplification unit 218. A result of the sensing from the sensing unit 219 may be provided to the control unit 212.

The matching unit 216 may adjust an impedance on the basis of the control of the control unit 212. The matching unit 216 may include at least one of a coil and a capacitor. The control unit 212 may control a connection state with at least one of the coil and the capacitor, and thereby may perform impedance matching.

The Tx resonance unit 211a may transmit input AC power to the Rx resonance unit 251a. The Tx resonance unit 211a and the Rx resonance unit 251a may be implemented by resonant circuits both having an identical resonance frequency. For example, the resonance frequency may be determined as 6.78 MHz. In an embodiment of the present invention, an inverter unit (not illustrated) may convert DC power from the driving unit 217 to AC power, and may output the AC power to the Tx resonance unit 211a.

Meanwhile, the communication unit 213 may communicate with the communication unit 253 of the wireless power receiver 250, and may perform communication (Wi-Fi, ZigBee, or BT/BLE) at, for example, a bidirectional 2.4 GHz frequency.

The Rx resonance unit 251a may receive power for charging.

The rectification unit 254 may rectify wireless power, which the Rx resonance unit 251a receives, in the form of DC, and may be implemented in the form of, for example, a diode bridge. The DC/DC conversion unit 255 may convert the rectified power by a preset gain. For example, the DC/DC conversion unit 255 may convert the rectified power in such a manner that an output side has a voltage of 5 V. Meanwhile, minimum and maximum values of a voltage which may be applied to a front end of the DC/DC conversion unit 255 may be preset.

The switching unit 256 may connect the DC/DC conversion unit 255 to the load unit 257. The switching unit 256 may maintain an on/off state according to the control of the control unit 252. The switching unit 256 may be omitted. When the switching unit 256 is in the on state, the load unit 257 may store the converted power which is input from the DC/DC conversion unit 255.

Figure 4:
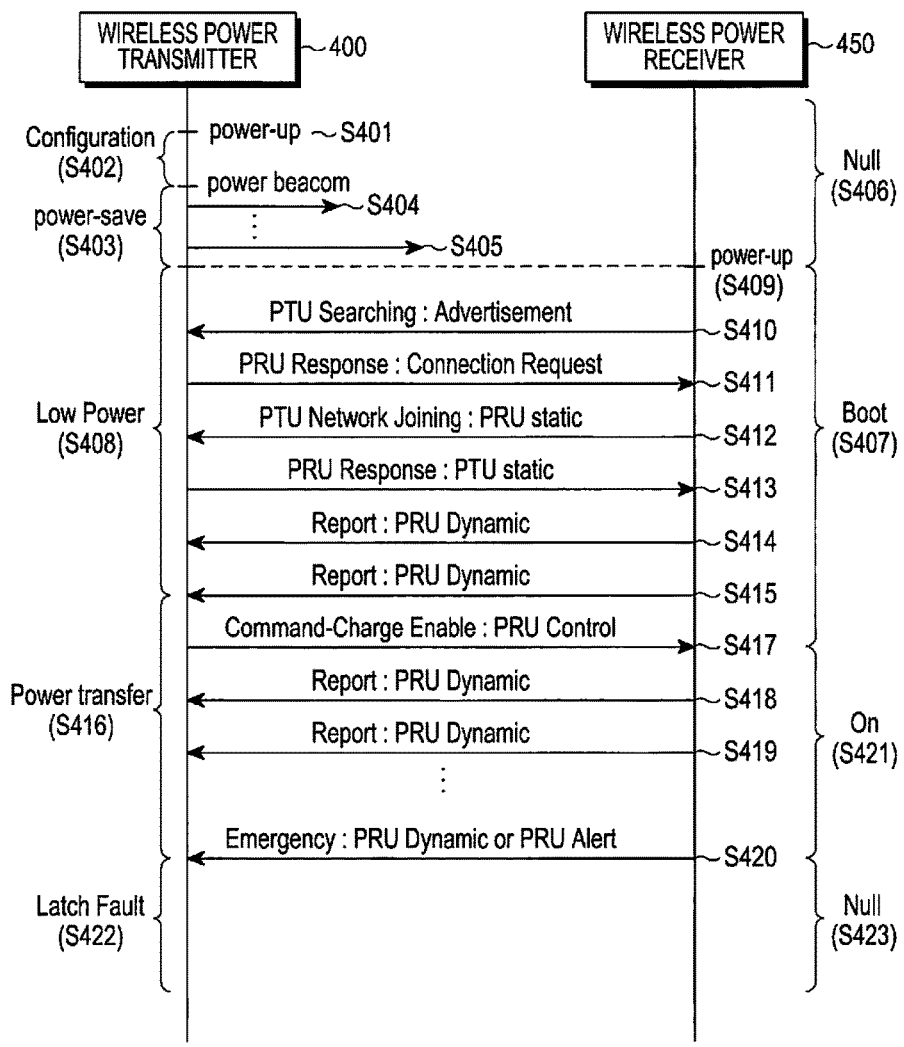
FIG. 4 is a signal flow diagram illustrating operations of a wireless power transmitter and a wireless power receiver according to an embodiment of the present invention.

FIG. 4 is a signal flow diagram illustrating operations of a wireless power transmitter and a wireless power receiver according to an embodiment of the present invention. As illustrated in FIG. 4, the wireless power transmitter 400 may be powered on in step S401. When the wireless power transmitter 400 is powered on, the wireless power transmitter 400 may configure an environment in step S402.

The wireless power transmitter 400 may enter a power save mode in step S403. In the power save mode, the wireless power transmitter 400 may apply different types of detection power beacons in respective cycles, and this configuration will be described in more detail with reference to FIG. 6. For example, as illustrated in FIG. 4, the wireless power transmitter 400 may apply detection power beacons (e.g., short beacons or long beacons) of steps S404 and S405, and sizes of power values of the detection power beacons of steps S404 and S405 may be different. Some or all of the detection power beacons of steps S404 and S405 may have the amount of power and an application time period which enable driving of the communication unit of the wireless power receiver 450. For example, the wireless power receiver 450 may drive the communication unit by using some or all of the detection power beacons of steps S404 and S405 and may communicate with the wireless power transmitter 400. The above-described state may be referred to as a "null state (S406)."

The wireless power transmitter 400 may detect a load change due to the placement of the wireless power receiver 450. The wireless power transmitter 400 may enter a low power mode in step S408. The low power mode will be described in more detail with reference to FIG. 6. Meanwhile, the wireless power receiver 450 may drive the communication unit on the basis of power received from the wireless power transmitter 400, in step S409.

The wireless power receiver 450 may transmit a wireless power transmitter (i.e., Power Transmitting Unit (PTU)) searching signal to the wireless power transmitter 400 in step S410. The wireless power receiver 450 may transmit the PTU searching signal as a BLE-based ADvertisement (AD) signal. The wireless power receiver 450 may transmit a PTU searching signal periodically, and may transmit the PTU searching signal until the wireless power receiver 450 receives a response signal from the wireless power transmitter 400 or until a preset time period arrives.

When receiving the PTU searching signal from the wireless power receiver 450, the wireless power transmitter 400 may transmit a wireless power receiver (i.e., Power Receiving Unit (PRU)) response signal in step S411. Here, the PRU response signal may form a connection between the wireless power transmitter 400 and the wireless power receiver 450.

The wireless power receiver 450 may transmit a PRU static signal in step S412. Here, the PRU static signal may be a signal indicating a state of the wireless power receiver 450, and may be used to request subscription to the wireless power network managed by the wireless power transmitter 400.

The wireless power transmitter 400 may transmit a PTU static signal in step S413. The PTU static signal transmitted by the wireless power transmitter 400 may be a signal indicating the capability of the wireless power transmitter 400.

When the wireless power transmitter 400 and the wireless power receiver 450 transmit and receive the PRU static signal and the PTU static signal, the wireless power receiver 450 may periodically transmit a PRU dynamic signal in steps S414 and S415. The PRU dynamic signal may include at least one piece of parameter information measured by the wireless power receiver 450. For example, the PRU dynamic signal may include voltage information at the rear end of the rectification unit of the wireless power receiver 450. The state of the wireless power receiver 450 may be referred to as a "boot state (S407)."

The wireless power transmitter 400 may enter a power transmission mode in step S416, and may transmit a PRU control signal, which is a command signal for allowing the wireless power receiver 450 to perform charging, in step S417. In the power transmission mode, the wireless power transmitter 400 may transmit charging power.

The PRU control signal transmitted by the wireless power transmitter 400 may include information, which enables/disables charging of the wireless power receiver 450, and permission information. The PRU control signal may be transmitted whenever a charging state is changed. The PRU control signal may be transmitted, for example, every 250 ms, or may be transmitted when a parameter is changed. The PRU control signal may be set such that the PRU control signal needs to be transmitted within a preset threshold (e.g., 1 second) although the parameter is not changed.

The wireless power receiver 400 may change a configuration according to the PRU control signal and may transmit the PRU dynamic signal for reporting the state of the wireless power receiver 450, in steps S418 and S419. The PRU dynamic signal transmitted by the wireless power receiver 450 may include at least one piece of information among information on a voltage, a current, a state of the wireless power receiver, and a temperature thereof. The state of the wireless power receiver 450 may be referred to as an "on state."

Meanwhile, the PRU dynamic signal may have a data structure shown in Table 1 below.

TABLE 1

| Field | Octets | Description | use | units |
|---|---|---|---|---|
| optional fields | 1 | Defines which optional fields are populated | Mandatory | |
| $V_{RECT}$ | 2 | Voltage at diode output | Mandatory | mV |
| $I_{RECT}$ | 2 | Current at diode output | Mandatory | mA |
| $V_{out}$ | 2 | Voltage at charge/battery port | Optional | mV |
| $I_{out}$ | 2 | Current at charge/battery port | Optional | mA |
| temperature | 1 | Temperature of PRU | Optional | Deg C. from −40 C. |
| $V_{RECT\_MIN\_DYN}$ | 2 | $V_{RECT\_LOW\_LIMIT}$ (dynamic value) | Optional | mV |
| $V_{RECT\_SET\_DYN}$ | 2 | Desired $V_{RECT}$ (dynamic value) | Optional | mV |
| $V_{RECT\_HIGH\_DYN}$ | 2 | $V_{RECT\_HIGH\_LIMIT}$ (dynamic value) | Optional | mV |
| PRU alert | 1 | Warnings | Mandatory | Bit field |
| RFU | 3 | Undefined | | |

As shown in Table 1, the PRU dynamic signal may include at least one field. The respective fields may have, configured therein, optional field information, voltage information at the rear end of the rectification unit of the wireless power receiver, current information at the rear end of the rectification unit of the wireless power receiver, voltage information at the rear end of the DC/DC conversion unit of the wireless power receiver, current information at the rear end of the DC/DC conversion unit of the wireless power receiver, temperature information, minimum voltage value information (VRECT_MIN_DYN) at the rear end of the rectification unit of the wireless power receiver, optimal voltage value information (VRECT_SET_DYN) at the rear end of the rectification unit of the wireless power receiver, maximum voltage value information (VRECT_HIGH_DYN) at the rear end of the rectification unit of the wireless power receiver, and alert information (PRU alert). The PRU dynamic signal may include at least one of the above-described fields.

For example, one or more voltage setting values (e.g., the minimum voltage value information (VRECT_MIN_DYN) at the rear end of the rectification unit of the wireless power receiver, the optimal voltage value information (VRECT_SET_DYN) at the rear end of the rectification unit of the wireless power receiver, the maximum voltage value information (VRECT_HIGH_DYN) at the rear end of the rectification unit of the wireless power receiver, etc.) determined according to a charging state may be included in the respective fields, and may be transmitted in a state of being included in the respective fields. The wireless power transmitter, that has received the PRU dynamic signal as described above, may adjust a wireless charging voltage to be transmitted to each wireless power receiver with reference to the voltage setting values included in the PRU dynamic signal.

Among the fields, the alert information (PRU Alert) may be formed in the data structure shown in Table 2 below.

TABLE 2

| 7 | 6 | 5 | 4 | 3 | 2 | 1 | 0 |
|---|---|---|---|---|---|---|---|
| over-voltage | over-current | over-temperature | Charge Complete | TA detect | Transition | restart request | RFU |

Referring to Table 2, the alert information (PRU Alert) may include a bit for restart request, a bit for transition, and a bit for detecting insertion of a wired charging adapter (Travel Adapter (TA) detect). The TA detect represents a bit which allows the wireless power receiver to notify that a wired charging terminal is connected in the wireless power transmitter that provides wireless charging. The bit for transition represents a bit notifying the wireless power transmitter that the wireless power receiver is reset before a communication Integrated Circuit (IC) of the wireless power receiver transitions from the SA mode to the NSA mode. Lastly, the restart request represents a bit which allows the wireless power receiver to notify the wireless power transmitter that the wireless power transmitter is ready to resume charging when the wireless power transmitter has reduced transmission power due to the occurrence of an over-current state or an over-temperature state, has discontinued the charging, and returns to a normal state.

Also, the alert information (PRU Alert) may be formed in the data structure shown in Table 3 below.

Referring to Table 3, the alert information may include over-voltage, over-current, over-temperature, PRU self protection, charge complete, wired charger detect, mode transition, and the like. Here, when an over-voltage field is set to 1, the over-voltage field may indicate that Vrect in the wireless power receiver exceeds a limit of the over-voltage. Also, the over-current and the over-temperature may be set in a manner similar to that in the case of the over-voltage. Further, the PRU self protection indicates that the wireless power receiver protects itself by directly reducing power applied to a load. In this case, the wireless power transmitter does not need to change a charging state.

Bits for a mode transition according to an embodiment of the present invention may be set as a value for notifying the wireless power transmitter of a time period during which a mode transition procedure is performed. The bits indicating the mode transition time period may be expressed as shown in Table 4 below.

TABLE 4

| Value (Bit) | Mode Transition Bit Description |
|---|---|
| 00 | No Mode Transition |
| 01 | 2 s Mode Transition time limit |
| 10 | 3 s Mode Transition time limit |
| 11 | 6 s Mode Transition time limit |

Referring to Table 4, "00" may indicate no mode transition, "01" may indicate that a time period required to complete a mode transition is a maximum of 2 seconds, "10" may indicate that a time period required to complete a mode transition is a maximum of 3 seconds, and "11" may indicate that a time period required to complete a mode transition is a maximum of 6 seconds.

For example, when 3 seconds or less are required to complete a mode transition, the mode transition bits may be set to "10." Before starting the mode transition procedure, the wireless power receiver may impose the restriction that no impedance change occurs during the mode transition procedure by changing an input impedance setting so as to match a 1.1 W power draw. Accordingly, the wireless power transmitter may adjust power ITX_COIL for the wireless power receiver according to this setting, and thus may maintain the power ITX_COIL for the wireless power receiver during the mode transition time period.

Therefore, when a mode transition time period is set by the mode transition bits, the wireless power transmitter may maintain the power ITX_COIL for the wireless power receiver during the mode transition time period (e.g., 3 seconds). Specifically, although the wireless power trans-

TABLE 3

| 7 | 6 | 5 | 4 | 3 | 2 | 1 | 0 |
|---|---|---|---|---|---|---|---|
| PRU over-voltage | PRU over-current | PRU over-temperature | PRU self protection | Charge Completed | Wired Charger Detect | Mode transition Bit 1 | Mode transition Bit 0 | mitter does not receive a response from the wireless power receiver for 3 seconds, the wireless power transmitter may maintain a connection to the wireless power receiver. However, after the mode transition time period passes, the wireless power transmitter may regard the wireless power receiver as a rogue object and may terminate the power transmission.

Meanwhile, the wireless power receiver 450 may detect the occurrence of an error. The wireless power receiver 450 may transmit an alert signal to the wireless power transmitter 400 in step S420. The alert signal may be transmitted as the PRU dynamic signal or a PRU alert signal. For example, the wireless power receiver 450 may reflect the error situation in the PRU alert field of Table 1 and may transmit the PRU alert field, in which the error situation is reflected, to the wireless power transmitter 400. Alternatively, the wireless power receiver 450 may transmit a single alert signal, which indicates the error situation, to the wireless power transmitter 400. When receiving the alert signal, the wireless power transmitter 400 may enter a latch fault mode in step S422. The wireless power receiver 450 may enter a null state in step S423.

Figure 5:
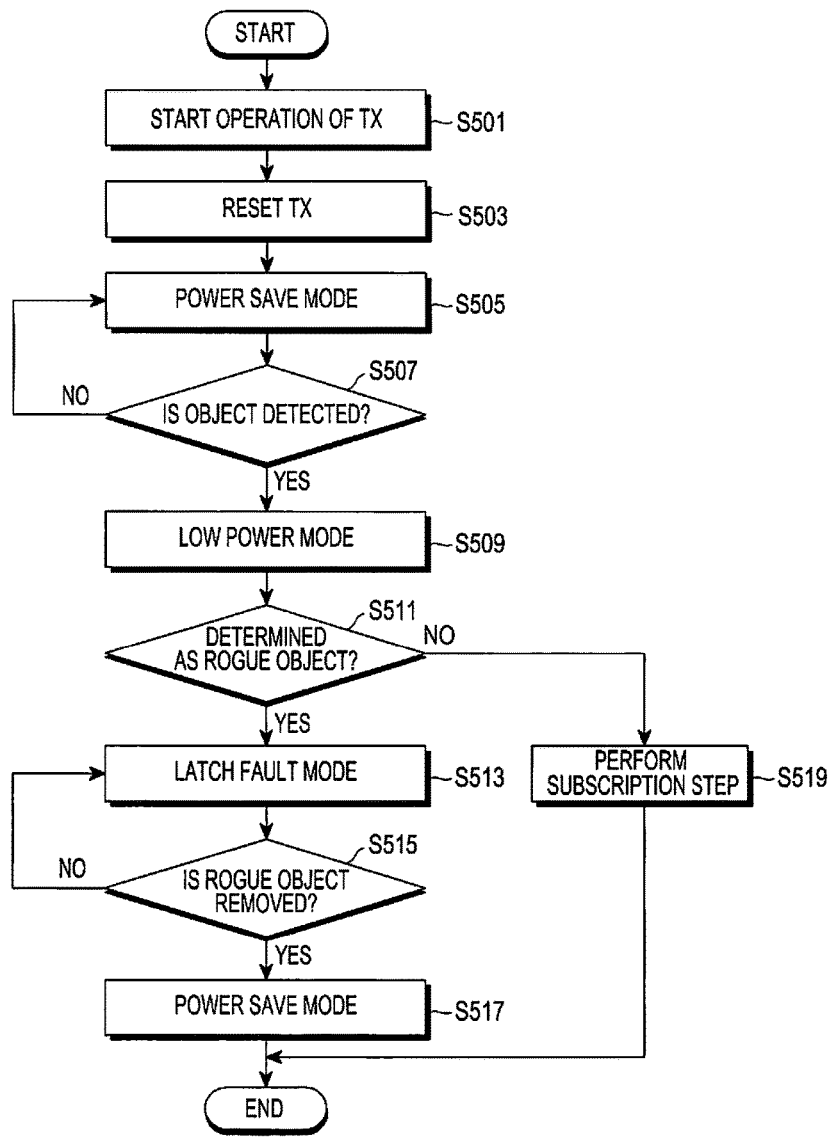
FIG. 5 is a flowchart illustrating operations of a wireless power transmitter and a wireless power receiver according to another embodiment of the present invention.
Figure 6:
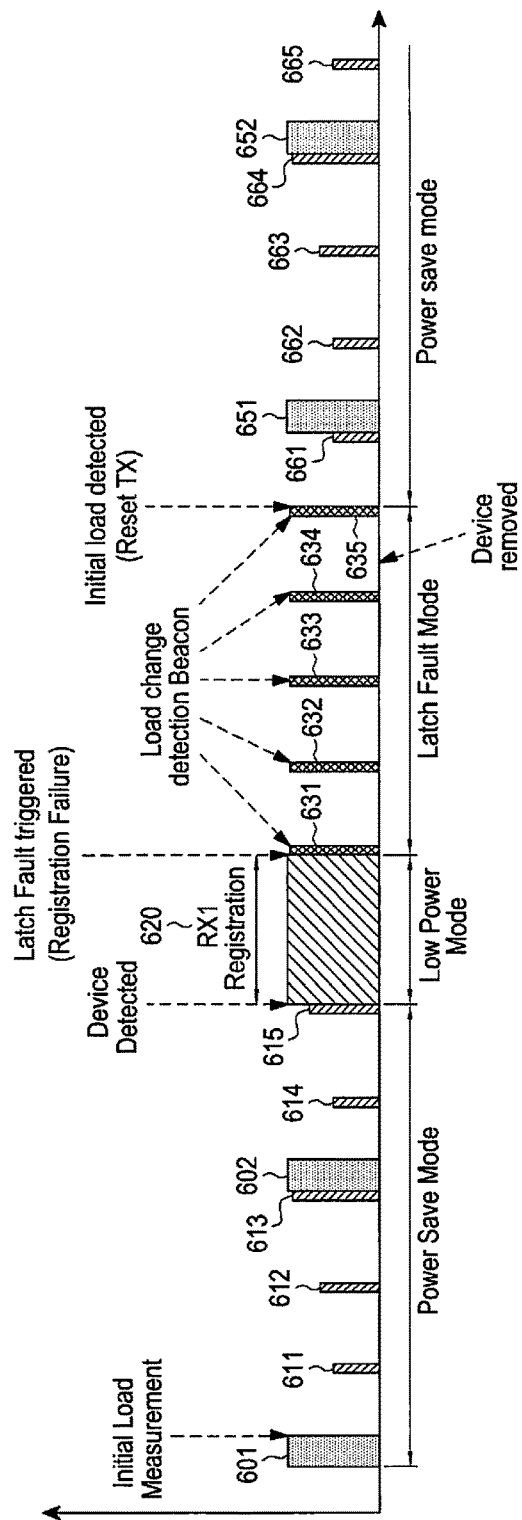
FIG. 6 is a graph of the amount of power applied by a wireless power transmitter against a time axis.

FIG. 5 is a flowchart illustrating operations of a wireless power transmitter and a wireless power receiver according to another embodiment of the present invention. The control method illustrated in FIG. 5 will be described in more detail with reference to FIG. 6. FIG. 6 is a graph of the amount of power applied by a wireless power transmitter against a time axis according to an embodiment of FIG. 5.

As illustrated in FIG. 5, the wireless power transmitter may start the operation thereof in step S501. Also, the wireless power transmitter may reset an initial configuration thereof in step S503. The wireless power transmitter may enter a power save mode in step S505. Here, the power save mode may correspond to a period, during which the wireless power transmitter may apply different types of power having different power amounts to the power transmission unit. For example, the power save mode may correspond to a period, during which the wireless power transmitter may apply second detection power 601 and 602 and third detection power 611, 612, 613, 614, and 615 illustrated in FIG. 6 to the power transmission unit. Here, the wireless power transmitter may periodically apply the second detection power 601 and 602 in a second cycle. When applying the second detection power 601 and 602, the wireless power transmitter may apply the second detection power 601 and 602 during a second period. The wireless power transmitter may periodically apply the third detection power 611, 612, 613, 614, and 615 in a third cycle. When applying the third detection power 611, 612, 613, 614, and 615, the wireless power transmitter may apply the third detection power 611, 612, 613, 614, and 615 during a third period. Meanwhile, although it is illustrated that power values of the third detection power 611, 612, 613, 614, and 615 are different, the power values of the third detection power 611, 612, 613, 614, and 615 may be different or identical.

After outputting the third detection power 611, the wireless power transmitter may output the third detection power 612 having a power amount identical to that of the third detection power 611. When the wireless power transmitter outputs the third detection power 611 and 612 both having the identical power amount as described above, the third detection power may have a power amount which enables the detection of a smallest wireless power receiver, for example, a wireless power receiver of category 1.

On the other hand, after outputting the third detection power 611, the wireless power transmitter may output the third detection power 612 having a power amount different from that of the third detection power 611. When the wireless power transmitter outputs the third detection power 612 having a power amount different from that of the third detection power 611 as described above, the third detection power may have respective power amounts which enable the detection of wireless power receivers of categories 1 to 5. For example, the third detection power 611 may have a power amount which enables the detection of a wireless power receiver of category 5. The third detection power 612 may have a power amount which enables the detection of a wireless power receiver of category 3. The third detection power 613 may have a power amount which enables the detection of a wireless power receiver of category 1.

Meanwhile, the second detection power 601 and 602 may be power which can drive the wireless power receiver. More specifically, the second detection power 601 and 602 may have a power amount value which can drive the control unit and/or the communication unit of the wireless power receiver.

The wireless power transmitter may apply the second detection power 601 and 602 and the third detection power 611, 612, 613, 614, and 615 to the power reception unit in second and third cycles, respectively. When the wireless power receiver is placed on the wireless power transmitter, an impedance seen from a point of the wireless power transmitter may be changed. While applying the second detection power 601 and 602 and the third detection power 611, 612, 613, 614, and 615, the wireless power transmitter may detect an impedance change. For example, while applying the third detection power 615, the wireless power transmitter may detect the impedance change. Accordingly, the wireless power transmitter may detect an object in step S507. When the object is not detected (No in step S507), the wireless power transmitter may maintain the power save mode, in which different types of power are periodically applied, in step S505.

In contrast, when the impedance is changed and thus the object is detected (Yes in step S507), the wireless power transmitter may enter a low power mode. Here, the low power mode is a mode in which the wireless power transmitter may apply driving power having a power amount which can drive the control unit and the communication unit of the wireless power receiver. For example, in FIG. 6, the wireless power transmitter may apply driving power 620 to the power transmission unit. The wireless power receiver may receive the driving power 620 and may drive the control unit and/or the communication unit with the received driving power 620. The wireless power receiver may communicate with the wireless power transmitter according to a predetermined scheme on the basis of the driving power 620. For example, the wireless power receiver may transmit/receive data required for authentication, and may subscribe to the wireless power network, that the wireless power transmitter manages, on the basis of the transmission/reception of the data. However, when a rogue object other than the wireless power receiver is placed on the wireless power transmitter, the data transmission/reception may not be performed. Accordingly, the wireless power transmitter may determine whether the placed object is a rogue object, in step S511. For example, when the wireless power transmitter does not receive a response from the object during a preset time period, the wireless power transmitter may determine that the object is a rogue object.

When the object is determined as the rogue object (Yes in step S511), the wireless power transmitter may enter the latch fault mode in step S513. In contrast, when it is determined that the object is not the rogue object (No in step S511), a subscription step may be performed in step S519. For example, the wireless power transmitter may periodically apply first power 631 to 634 illustrated in FIG. 6 in a first cycle. While applying the first power, the wireless power transmitter may detect an impedance change. For example, when the rogue object is removed (Yes in step S515), the wireless power transmitter may detect an impedance change, and may determine that the rogue object is removed. In contrast, when the rogue object is not removed (No in step S515), the wireless power transmitter may not detect the impedance change, and may determine that the rogue object is not removed. When the rogue object is not removed, the wireless power transmitter may output at least one of lamp light and an alert sound, and thereby may notify the user that the wireless power transmitter is currently in an error state. Accordingly, the wireless power transmitter may include an output unit that outputs at least one of the lamp light and the alert sound.

When it is determined that the rogue object is not removed (No in step S515), the wireless power transmitter may maintain the latch fault mode in step S513. In contrast, when it is determined that the rogue object is removed (Yes in step S515), the wireless power transmitter may re-enter the power save mode in step S517. For example, the wireless power transmitter may apply second power 651 and 652, and third power 661 to 665 illustrated in FIG. 6.

As described above, when the rogue object other than the wireless power receiver is placed, the wireless power transmitter may enter the latch fault mode. Also, in the latch fault mode, the wireless power transmitter may determine whether the rogue object has been removed on the basis of an impedance change which is based on applied power. Specifically, a latch fault mode entry condition in the embodiment of FIGS. 5 and 6 may be the placement of a rogue object. Meanwhile, the wireless power transmitter may have various latch fault mode entry conditions in addition to the placement of a rogue object. For example, the wireless power transmitter may be cross-connected to a wireless power receiver placed on another wireless power transmitter. In this case, the wireless power transmitter may also enter the latch fault mode.

Accordingly, when the wireless power transmitter is cross-connected to a wireless power receiver, the wireless power transmitter is required to return to an initial state, and the wireless power receiver is required to be removed. The wireless power transmitter may set a cross-connection, which corresponds to the subscription of a wireless power receiver placed on another wireless power transmitter to a wireless power network, as a latch fault mode entry condition. An operation of a wireless power transmitter in the case of occurrence of an error which includes the cross-connection will be described with reference to FIG. 7.

Figure 7:
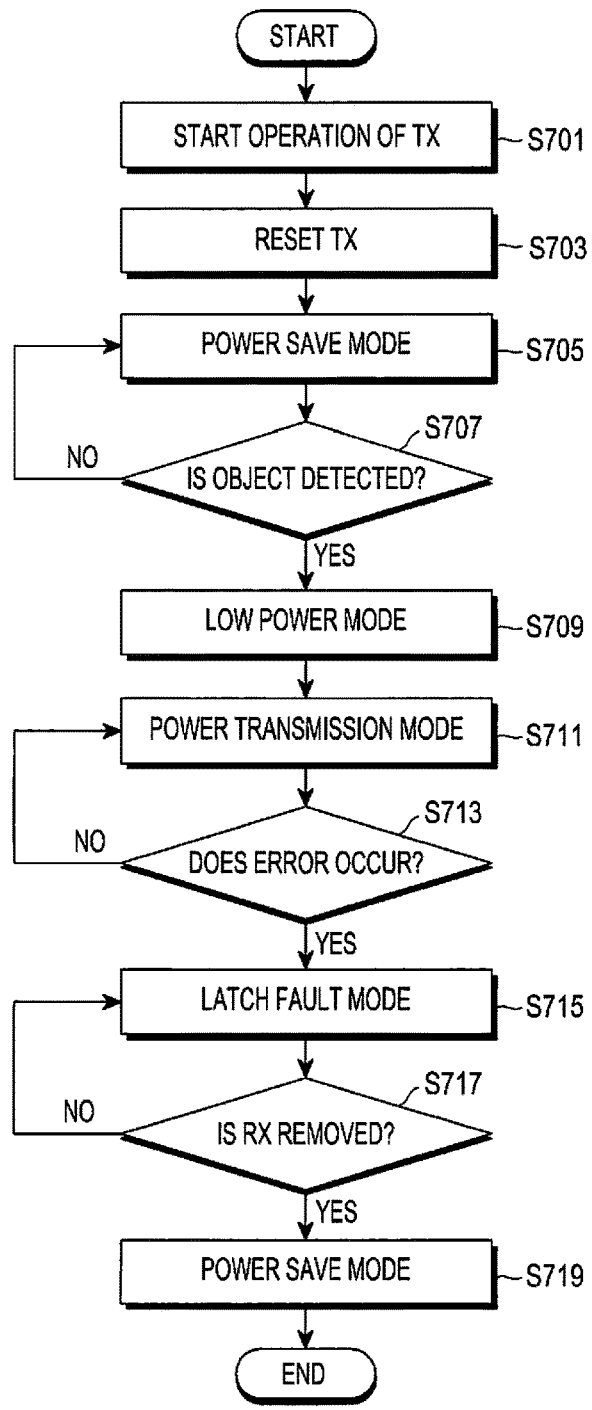
FIG. 7 is a flowchart illustrating a control method of a wireless power transmitter according to an embodiment of the present invention.
Figure 8:
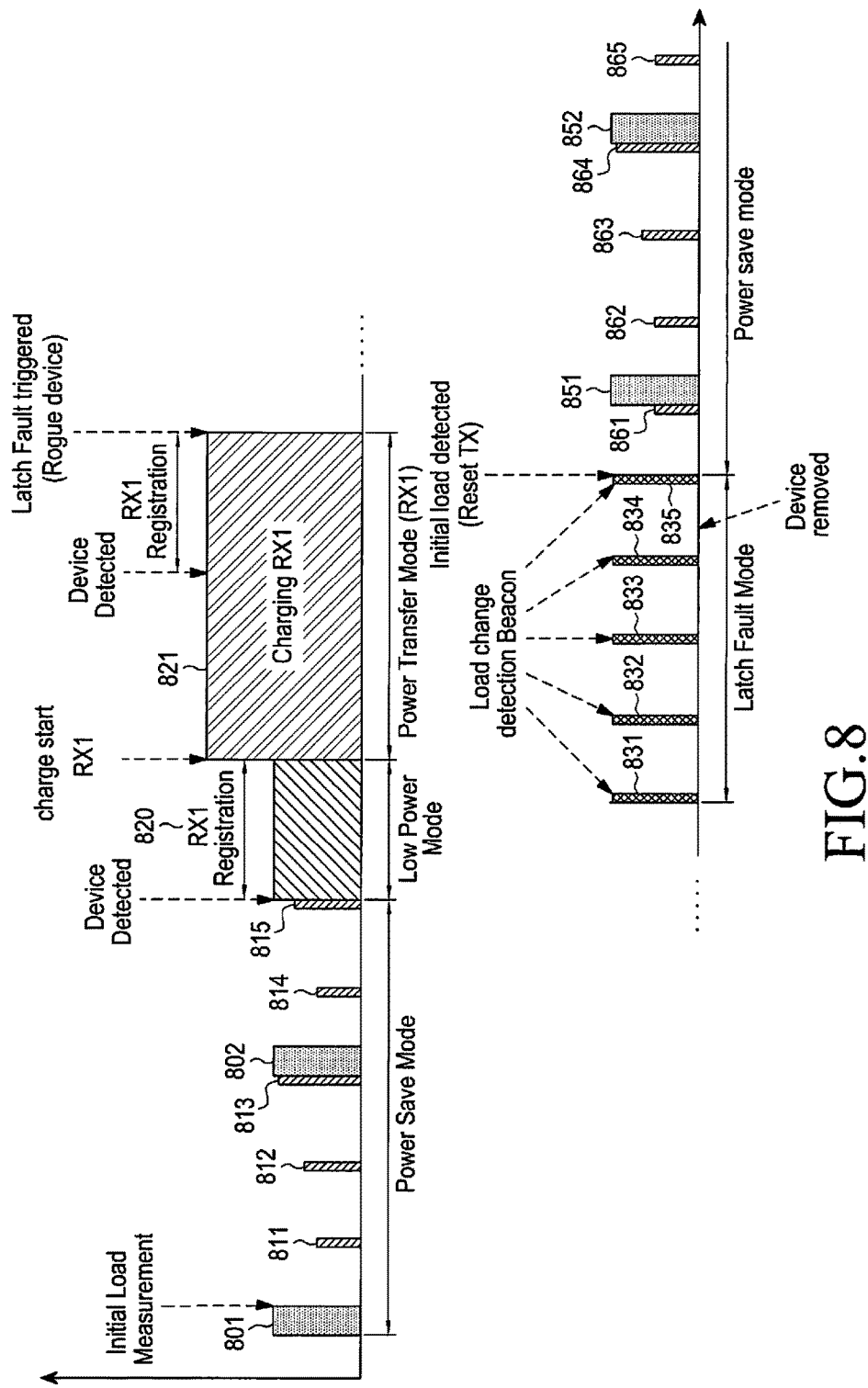
FIG. 8 is a graph of the amount of power applied by a wireless power transmitter against a time axis according to an embodiment of FIG. 7.

FIG. 7 is a flowchart illustrating a control method of a wireless power transmitter according to an embodiment of the present invention. The control method illustrated in FIG. 7 will be described in more detail with reference to FIG. 8. FIG. 8 is a graph of the amount of power applied by a wireless power transmitter against a time axis according to an embodiment of FIG. 7.

The wireless power transmitter may start the operation thereof in step S701. Also, the wireless power transmitter may reset an initial configuration thereof in step S703. The wireless power transmitter may enter a power save mode in step S705. Here, the power save mode may correspond to a period, during which the wireless power transmitter may apply different types of power having different power amounts to the power transmission unit. For example, the power save mode may correspond to a period, during which the wireless power transmitter may apply second detection power 801 and 802 and third detection power 811, 812, 813, 814, and 815 illustrated in FIG. 8 to the power transmission unit. Here, the wireless power transmitter may periodically apply the second detection power 801 and 802 in a second cycle. When applying the second detection power 801 and 802, the wireless power transmitter may apply the second detection power 801 and 802 during a second period. The wireless power transmitter may periodically apply the third detection power 811, 812, 813, 814, and 815 in a third cycle. When applying the third detection power 811, 812, 813, 814, and 815, the wireless power transmitter may apply the third detection power 811, 812, 813, 814, and 815 during a third period. Meanwhile, although it is illustrated that power values of the third detection power 811, 812, 813, 814, and 815 are different, the power values of the third detection power 811, 812, 813, 814, and 815 may be different or identical.

Meanwhile, the second detection power 801 and 802 may be power which can drive the wireless power receiver. More specifically, the second detection power 801 and 802 may have a power amount value which can drive the control unit and/or the communication unit of the wireless power receiver.

The wireless power transmitter may apply the second detection power 801 and 802 and the third detection power 811, 812, 813, 814, and 815 to the power reception unit in second and third cycles, respectively. When the wireless power receiver is placed on the wireless power transmitter, an impedance seen from a point of the wireless power transmitter may be changed. While applying the second detection power 801 and 802 and the third detection power 811, 812, 813, 814, and 815, the wireless power transmitter may detect an impedance change. For example, while applying the third detection power 815, the wireless power transmitter may detect the impedance change. Accordingly, the wireless power transmitter may detect an object in step S707. When the object is not detected (No in step S707), the wireless power transmitter may maintain the power save mode, in which different types of power are periodically applied, in step S705.

In contrast, when the impedance is changed and thus the object is detected (Yes in step S507), the wireless power transmitter may enter a low power mode. Here, the low power mode is a mode in which the wireless power transmitter may apply driving power having a power amount which can drive the control unit and/or the communication unit of the wireless power receiver. For example, in FIG. 8, the wireless power transmitter may apply driving power 820 to the power transmission unit. The wireless power receiver may receive the driving power 820 and may drive the control unit and/or the communication unit with the received driving power 820. The wireless power receiver may communicate with the wireless power transmitter according to a predetermined scheme on the basis of the driving power 820. For example, the wireless power receiver may transmit/receive data required for authentication, and may subscribe to the wireless power network, that the wireless power transmitter manages, on the basis of the transmission/reception of the data.

Then, the wireless power transmitter may enter the power transmission mode, in which charging power is transmitted, in step S711. For example, the wireless power transmitter may apply charging power 821 and the charging power may be transmitted to the wireless power receiver, as illustrated in FIG. 8.

In the power transmission mode, the wireless power transmitter may determine whether an error has occurred. Here, the error may be the placement of a rogue object on the wireless power transmitter, cross-connection, over-voltage, over-current, over-temperature, and the like. The wireless power transmitter may include a sensing unit capable of measuring the over-voltage, the over-current, over-temperature, and the like. For example, the wireless power transmitter may measure a voltage or a current at a reference point, and may determine a case where the measured voltage or current exceeds a threshold as satisfying an over-voltage condition or an over-current condition. Alternatively, the wireless power transmitter may include a temperature sensing means, and the temperature sensing means may measure a temperature at a reference point of the wireless power transmitter. When the temperature at the reference point exceeds the threshold, the wireless power transmitter may determine that an over-temperature condition is satisfied.

Meanwhile, when an over-voltage state, an over-current state, or an over-temperature state is determined according to a measurement value of the temperature, voltage, or current, the wireless power transmitter prevents the over-voltage, over-current, or over-temperature by reducing the wireless charging power by a preset value. At this time, when a voltage value of the reduced wireless charging power becomes less than a set minimum value (e.g., the minimum voltage value information (VRECT_MIN_DYN) at the rear end of the rectification unit of the wireless power receiver), the wireless charging is stopped, and thus, the voltage setting value may be re-adjusted according to an embodiment of the present invention.

Although the additional placement of a rogue object on the wireless power transmitter is illustrated as an error in the embodiment of FIG. 8, the error is not limited thereto, and it will be readily understood by those skilled in the art that the wireless power transmitter may operate in a similar process with respect to placement of a rogue object, cross-connection, over-voltage, over-current, and over-temperature.

When the error has not occurred (No in step S713), the wireless power transmitter may maintain the power transmission mode in step S711. In contrast, when the error has occurred (Yes in step S713), the wireless power transmitter may enter a latch fault mode in step S715. For example, the wireless power transmitter may apply first power 831 to 835 as illustrated in FIG. 8. Also, the wireless power transmitter may output an error occurrence display including at least one of lamp light and an alert sound during the latch fault mode. When it is determined that the rogue object or the wireless power receiver is not removed (No in step S717), the wireless power transmitter may maintain the latch fault mode in step S715. In contrast, when it is determined that the rogue object or the wireless power receiver is removed (Yes in step S717), the wireless power transmitter may re-enter the power save mode in step S719. For example, the wireless power transmitter may apply second power 851 and 852, and third power 861 to 865 illustrated in FIG. 8.

Hereinabove, the operation of the wireless power transmitter in the case of occurrence of an error during transmission of charging power has been described. Hereinafter, a description will be made of an operation of the wireless power transmitter in a case where multiple wireless power receivers placed on the wireless power transmitter receive charging power from the wireless power transmitter.

Figure 9:
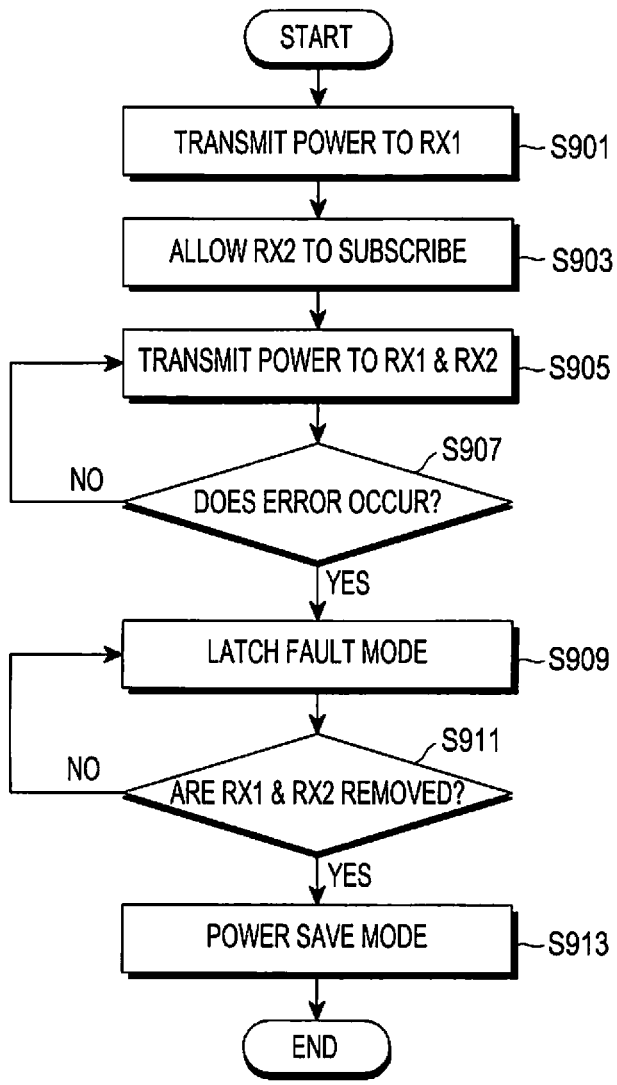
FIG. 9 is a flowchart illustrating a control method of a wireless power transmitter according to an embodiment of the present invention.
Figure 10:
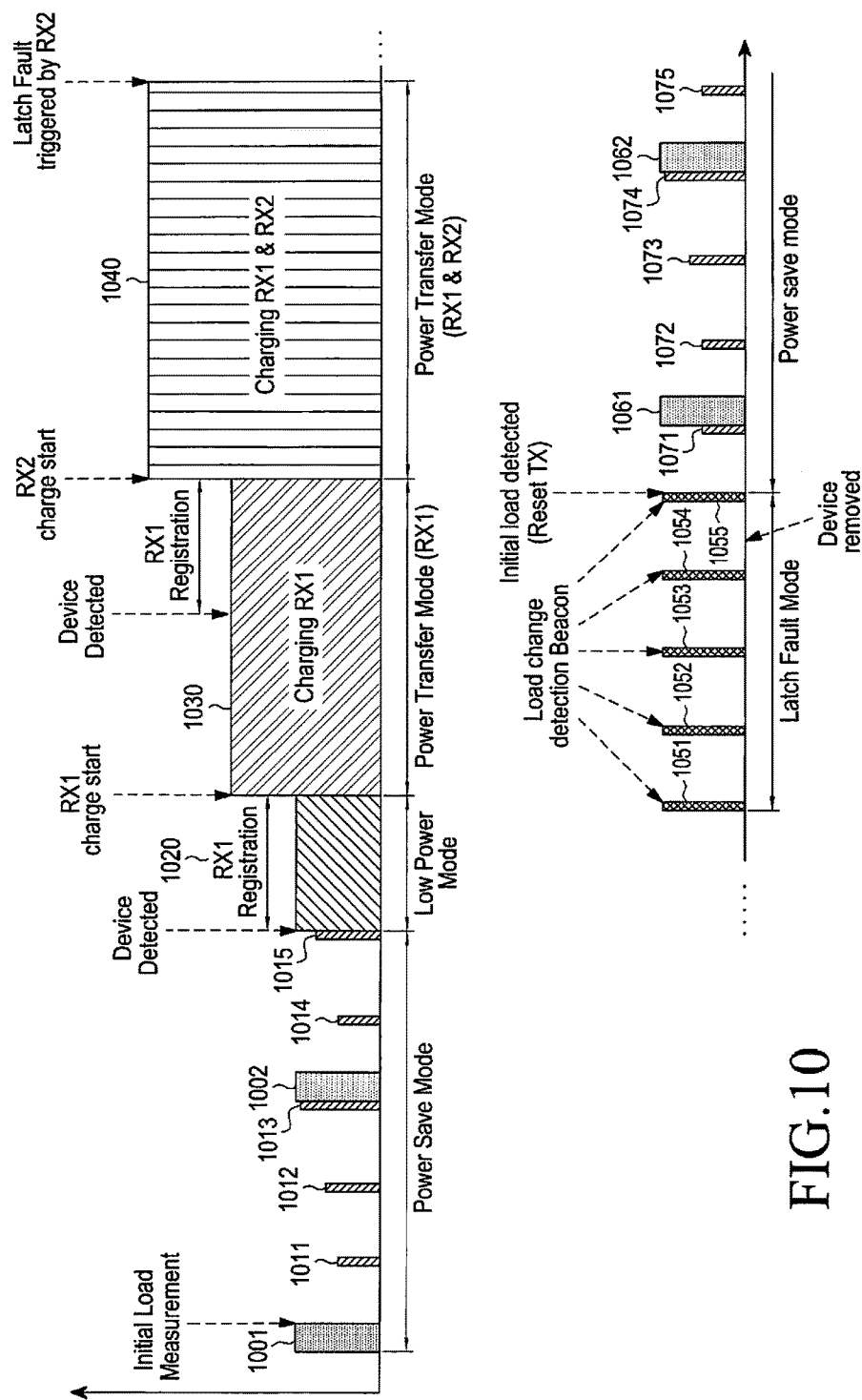
FIG. 10 is a graph of the amount of power applied by a wireless power transmitter against a time axis according to an embodiment of FIG. 9.

FIG. 9 is a flowchart illustrating a control method of a wireless power transmitter according to an embodiment of the present invention. The control method illustrated in FIG. 9 will be described in more detail with reference to FIG. 10. FIG. 10 is a graph of the amount of power applied by a wireless power transmitter against a time axis according to an embodiment of FIG. 9.

As illustrated in FIG. 9, the wireless power transmitter 400 may transmit charging power to a first wireless power receiver in step S901. Also, the wireless power transmitter may additionally allow a second wireless power receiver to subscribe to the wireless power network in step S903. Further, the wireless power transmitter may also transmit charging power to the second wireless power receiver in step S905. More specifically, the wireless power transmitter may apply the sum of the charging power required by the first wireless power receiver and the charging power required by the second wireless power receiver to power reception units of the first and second wireless power receivers.

FIG. 10 illustrates an embodiment of steps S901 to S905. For example, the wireless power transmitter may maintain the power save mode in which the wireless power transmitter applies second detection power 1001 and 1002 and third detection power 1011 to 1015. Then, the wireless power transmitter may detect the first wireless power receiver, and may enter the low power mode in which the wireless power transmitter maintains detection power 1020. Next, the wireless power transmitter may enter the power transmission mode in which the wireless power transmitter applies first charging power 1030. The wireless power transmitter may detect the second wireless power receiver, and may allow the second wireless power receiver to subscribe to the wireless power network. Also, the wireless power transmitter may apply second charging power 1040 having a power amount which is the sum of power amounts required by the first wireless power receiver and the second wireless power receiver.

Referring again to FIG. 9, while transmitting charging power to both the first and second wireless power receivers in step S905, the wireless power transmitter may detect the occurrence of an error in step S907. Here, as described above, the error may be placement of a rogue object, cross-connection, over-voltage, over-current, over-temperature, and the like. When the error has not occurred (No in step S907), the wireless power transmitter may maintain the application of the second charging power 1040.

In contrast, when the error has occurred (Yes in step S907), the wireless power transmitter may enter the latch fault mode in step S909. For example, the wireless power transmitter may apply first power 1051 to 1055 of FIG. 10 in a first cycle. The wireless power transmitter may determine whether both the first and second wireless power receivers have been removed, in step S911. For example, the wireless power transmitter may detect an impedance change while applying the first power 1051 to 1055. The wireless power transmitter may determine whether both the first and second wireless power receivers have been removed, on the basis of whether the impedance has returned to an initial value.

When it is determined that both the first and second wireless power receivers have been removed (Yes in step S911), the wireless power transmitter may enter the power save mode in step S913. For example, the wireless power transmitter may apply second detection power 1061 and 1062 and third detection power 1071 to 1075 respectively in second and third cycles, as illustrated in FIG. 10.

As described above, even when the wireless power transmitter applies charging power to multiple wireless power receivers, in the case of occurrence of an error, the wireless power transmitter may easily determine whether a wireless power receiver or a rogue object has been removed.

Figure 11:
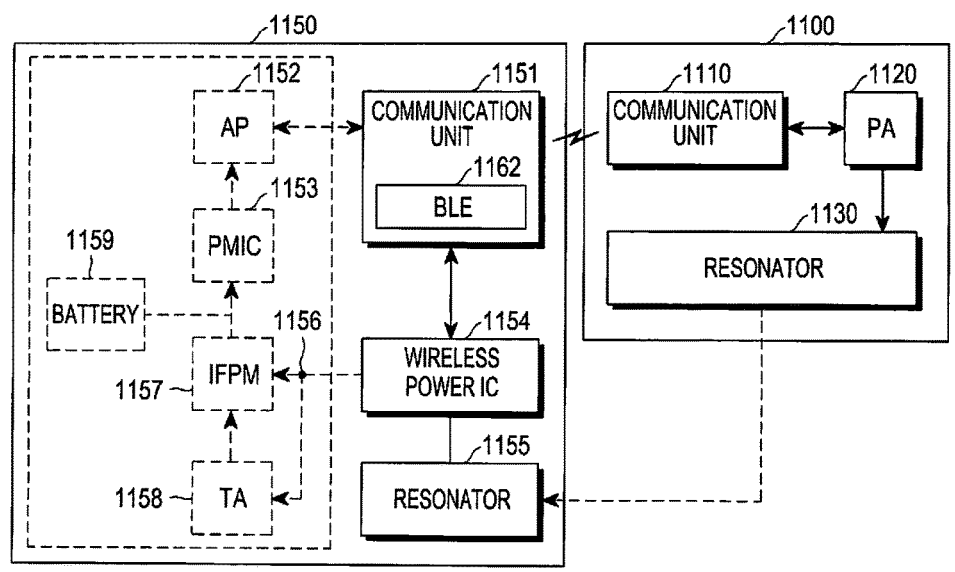
FIG. 11 is block diagrams illustrating a wireless power transmitter and a wireless power receiver in a Stand Alone (SA) mode according to an embodiment of the present invention.

FIG. 11 is block diagrams illustrating a wireless power transmitter and a wireless power receiver in a SA mode according to an embodiment of the present invention.

The wireless power transmitter 1100 may include a communication unit 1110, a Power Amplifier (PA) 1120, and a resonator 1130. The wireless power receiver 1150 may include a communication unit (a Wireless Power Transfer (WPT) Communication IC) 1151, an Application Processor (AP) 1152, a Power Management Integrated Circuit (PMIC) 1153, a Wireless Power Integrated Circuit (WPIC) 1154, a resonator 1155, an Interface Power Management IC (IFPM) 1157, a Travel Adapter (TA) 1158, and a battery 1159.

The communication unit 1110 may be implemented by a WiFi/BT combination IC, and may communicate with the communication unit 1151 in a predetermined communication scheme (e.g., a BLE scheme). For example, the communication unit 1151 of the wireless power receiver 1150 may transmit a PRU dynamic signal having the data structure shown in Table 1 to the communication unit 1110 of the wireless power transmitter 1100. As described above, the PRU dynamic signal may include at least one piece of information among voltage information, current information, temperature information, and alert information of the wireless power receiver 1150.

The value of power which is output from the PA 1120 may be adjusted on the basis of the received PRU dynamic signal. For example, when the over-voltage, over-current, or over-temperature is applied to the wireless power receiver 1150, the value of a power output from the PA 1120 may be reduced. Also, when a voltage or current of the wireless power receiver 1150 has a value less than a preset value, the value of power output from the PA 1120 may be increased.

Charging power from the resonator 1130 may be wirelessly transmitted to the resonator 1155.

The WPIC 1154 may rectify the charging power received from the resonator 1155 and perform DC/DC conversion on the rectified charging power. The WPIC 1154 may drive the communication unit 1151 or may charge the battery 1159 with the converted power.

Meanwhile, a wired charging terminal may be inserted into the TA 1158. A wired charging terminal, such as a 30-pin connector, a Universal Serial Bus (USB) connector, or the like, may be inserted into the TA 1158, and the TA 1158 may receive power supplied from an external power source and may charge the battery 1159 with the received power.

The IFPM 1157 may process the power received from the wired charging terminal and output the processed power to the battery 1159 and the PMIC 1153.

The PMIC 1153 may manage power received wirelessly or by wire and power applied to each element of the wireless power receiver 1150. The AP 1152 may receive power information from the PMIC 1153 and control the communication unit 1151 to transmit a PRU dynamic signal for reporting the power information.

A node 1156 connected to the WPIC 1154 may also be connected to the TA 1158. When a wired charging connector is inserted into the TA 1158, a preset voltage (e.g., 5 V) may be applied to the node 1156. The WPIC 1154 may monitor the voltage applied to the node 1156, and thereby may determine whether the TA is inserted.

Meanwhile, the AP 1152 has a stack of a predetermined communication scheme, for example, a WiFi/BT/BLE stack. Accordingly, when communication for wireless charging is performed, the communication unit 1151 may load the stack from the AP 1152, and may then communicate with the communication unit 1110 of the wireless power transmitter 1100 by using a BT or BLE communication scheme on the basis of the stack.

However, there may occur a state in which data for transmitting wireless power cannot be fetched from the AP 1152 in a power-off state of the AP 1152 or a state in which power becomes too small to maintain an on-state of the AP 1152 during fetching the data from a memory of the AP 1152 and using the fetched data.

When the residual power amount of the battery 1159 is less than a minimum power threshold as described above, the AP 1152 may be turned off and the battery 1159 may be wirelessly charged by using some elements (e.g., the communication unit 1151, the WPIC 1154, the resonator 1155, etc.) for wireless charging disposed in the wireless power receiver. Here, a state in which enough power to be capable of turning on the AP 1152 cannot be supplied may be referred to as a "dead battery state."

Because the AP 1152 is not driven in the dead battery state, the communication unit 1151 may not receive the stack of the predetermined communication scheme, for example, the WiFi/BT/BLE stack, from the AP 1152. In preparation for this case, a part of the stack of the predetermined communication scheme, for example, the BLE stack, may be fetched from the AP 1152 and may be stored in a memory 1162 of the communication unit 1151. Accordingly, the communication unit 1151 may communicate with the wireless power transmitter 1100 for wireless charging by using the stack (i.e., a wireless charging protocol) of the communication scheme stored in the memory 1162. At this time, the communication unit 1151 may include an internal memory, and the BLE stack may be stored in a memory in the form of a Read Only Memory (ROM) in the SA mode.

As described above, a mode in which the communication unit 1151 performs communication by using the stack of the communication scheme stored in the memory 1162 may be referred to as the "SA mode." Accordingly, the communication unit 1151 may manage the charging procedure on the basis of the BLE stack.

Hereinabove, the concept of the wireless charging system which may be applied to the embodiments of the present invention has been described with reference to FIGS. 1 to 11. Hereinafter, the wireless charging transmitter according to an embodiment of the present invention will be described in detail with reference to FIGS. 12 to 17.

Figure 12:
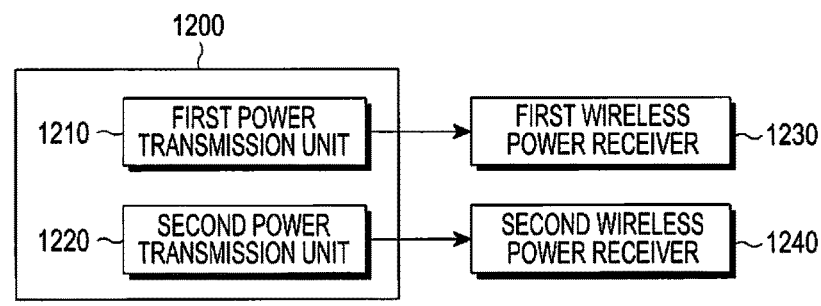
FIG. 12 is a block diagram illustrating a wireless power transmitter and a wireless power receiver according to various embodiments of the present invention.

FIG. 12 is a block diagram illustrating a wireless power transmitter and a wireless power receiver according to various embodiments of the present invention.

As illustrated in FIG. 12, the wireless power transmitter 1200 may wirelessly transmit wireless power to at least one of wireless power receivers 1230 and 1240. The wireless power transmitter 1200 may include multiple power transmission units 1210 and 1220. The respective multiple power transmission units 1210 and 1220 may have different characteristics. In an embodiment of the present invention, a first power transmission unit 1210 and a second power transmission unit 1220 may be included in different classes. Here, classes may be related to the amount of power transmitted by a power transmission unit, and may be divided into class 1 to class 5. Meanwhile, wireless power receivers may be classified into categories according to the amount of received power or the amount of driving power. Categories may be classified into, for example, category 1 to category 4. A wireless power transmitter included in class 1 may transmit wireless power to one wireless power receiver included in category 1. A wireless power transmitter included in class 2 may transmit wireless power to one wireless power receiver included in category 1, 2, or 3. A wireless power transmitter included in class 3 may transmit wireless power to two wireless power receivers included in category 1, 2, or 3, or may transmit wireless power to one wireless power receiver included in category 4. A wireless power transmitter included in class 5 may transmit enough wireless power to be capable of being transmitted without a limit to categories of wireless power receivers.

In an embodiment of the present invention, the first power transmission unit 1210 may be included in the fourth class, and the second power transmission unit 1220 may be included in the second class. The wireless power transmitter 1200 may transmit wireless power to the first wireless power receiver 1230. In an embodiment of the present invention, the wireless power transmitter 1200 may transmit wireless power to the first wireless power receiver 1230 through the first power transmission unit 1210. Here, the first wireless power receiver 1230 may be included in the fourth category. Also, the second wireless power receiver 1240 may be included in the first category.

The wireless power transmitter 1200 may acquire information of each of the first wireless power receiver 1230 and the second wireless power receiver 1240. For example, the wireless power transmitter 1200 may receive a message including information on a category, from each of the first wireless power receiver 1230 and the second wireless power receiver 1240. The wireless power transmitter 1200 may determine a power transmission unit, that is to transmit wireless power, in response to a category of the first wireless power receiver 1230. In the above-described example, when the first wireless power receiver 1230 is included in the fourth category, the wireless power transmitter 1200 may determine that the first power transmission unit 1210 capable of providing wireless power to a wireless power receiver of the fourth category is a power transmission unit to transmit wireless power. Meanwhile, when the second wireless power receiver 1240 is included in the first category, the wireless power transmitter 1200 may determine that the first power transmission unit 1210 and the second power transmission unit 1220 capable of providing wireless power to a wireless power receiver of the first category are power transmission units to transmit wireless power. When the multiple power transmission units are determined, the wireless power transmitter 1200 may determine that the power transmission unit included in a lower class is a power transmission unit to transmit wireless power. This is for preventing a waste of power. When the first power transmission unit 1210 transmits power to the second wireless power receiver 1240, unnecessarily large wireless power may be used for driving, and accordingly, the wireless power may be wasted. The first power transmission unit 1210 may select a power reception unit of the lowest class among power reception units capable of providing power to a wireless power receiver, and thereby can minimize the wasted wireless power.

In still another embodiment of the present invention, the wireless power transmitter 1200 may determine a power transmission unit to transmit wireless power on the basis of at least one of a location, a form, and a temperature of a wireless power receiver.

Meanwhile, each of the first power transmission unit 1210 and the second power transmission unit 1220 may be a resonator. In this case, the first power transmission unit 1210 and the second power transmission unit 1220 may share elements required to transmit wireless power, such as a matching unit, an amplifier, and the like. In still another embodiment of the present invention, each of the first power transmission unit 1210 and the second power transmission unit 1220 may include a resonator, a matching unit, and an amplifier.

Meanwhile, the first power transmission unit 1210 may communicate with the second power transmission unit 1220.

Figure 13:
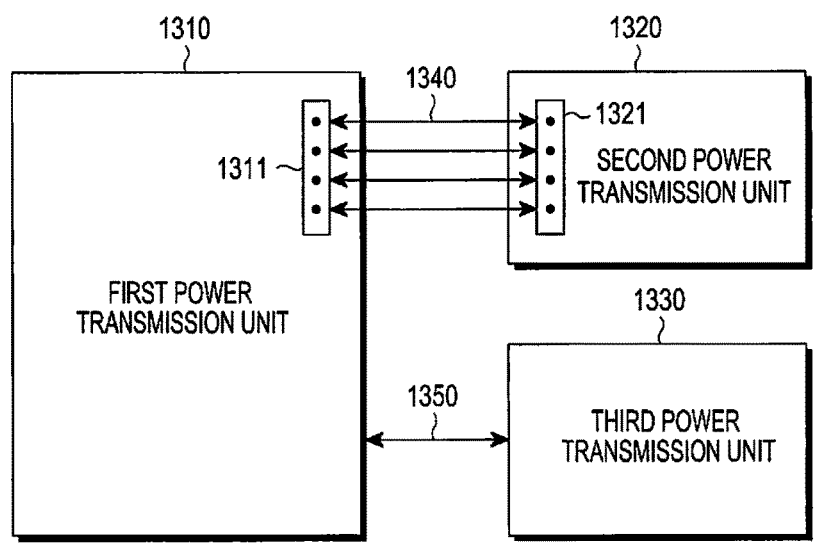
FIG. 13 is a conceptual view for explaining a connection between power transmission units according to various embodiments of the present invention.

FIG. 13 is a conceptual view for explaining a connection between power transmission units according to various embodiments of the present invention.

As illustrated in FIG. 13, a second power transmission unit 1320 and a third power transmission unit 1330 may be connected to a first power transmission unit 1310. Here, the first power transmission unit 1310 may be a master power transmission unit, and the second power transmission unit 1320 and the third power transmission unit 1330 may be slave power transmission units. For example, the wireless power transmitter 1200 may determine that the first power transmission unit 1310 included in the highest class is a master power transmission unit. In still another embodiment of the present invention, the wireless power transmitter 1200 may determine that the first power transmission unit 1310 implemented in hardware within the wireless power transmitter 1200 is a master power transmission unit, and may determine that the second power transmission unit 1320 and the third power transmission unit 1330 attachable/detachable to/from the wireless power transmitter 1200 are slave power transmission units.

In an embodiment of the present invention, the second power transmission unit 1320 may be connected by wire (as indicated by reference numeral 1340) to the first power transmission unit 1310 through a port 1311. The second power transmission unit 1320 may include a port 1321 for the wired connection 1340. The port 1311 of the first power transmission unit 1310 and the port 1321 of the second power transmission unit 1320 may have respective structures enabling a combination therebetween. For example, the port 1311 of the first power transmission unit 1310 and the second power transmission unit 1320 may be implemented as a socket and a plug, respectively. In this regard, it will be readily understood by those skilled in the art that there is no limit to a physical combination for an electrical connection between electrical elements. Accordingly, the wireless power transmitter 1200 may provide the second power transmission unit 1320 with driving power for power transmission.

In still another embodiment of the present invention, the third power transmission unit 1330 may be wirelessly connected (as indicated by reference numeral 1350) to the first power transmission unit 1310. For example, the third power transmission unit 1330 may be electromagnetically coupled to the first power transmission unit 1310. The first power transmission unit 1310 may include at least one first inductor for resonance, and the third power transmission unit 1330 may include at least one third inductor for resonance. The first inductor and the third inductor may be inductively coupled to each other, and accordingly, the wireless power transmitter 1200 may provide the third power transmission unit 1330 with driving power for power transmission.

As described above, according to various embodiments of the present invention, the master power transmission unit and the slave power transmission unit may be connected by wire or wirelessly to each other. The power transmission units may be connected in series or in parallel.

Figure 14:
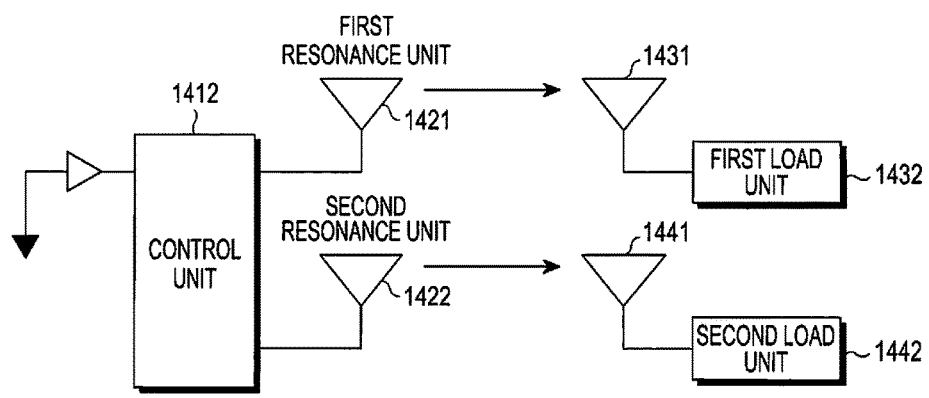
FIG. 14 is a conceptual view for explaining a wireless power transmitter and a wireless power receiver according to various embodiments of the present invention.

FIG. 14 is a conceptual view for explaining a wireless power transmitter and a wireless power receiver according to various embodiments of the present invention.

As illustrated in FIG. 14, the wireless power transmitter may include an amplification unit 1411, a control unit 1412, a first resonance unit 1421, and a second resonance unit 1422. The first resonance unit 1421 and the second resonance unit 1422 may be included in different classes. For example, the first resonance unit 1421 may be included in a higher class than that of the second resonance unit 1422. Specifically, the wireless power transmitter may include the multiple resonance units 1421 and 1422 which are respectively included in different classes.

Meanwhile, the wireless power transmitter may include the amplification unit 1411 for transmitting power, in addition to the multiple resonance units 1421 and 1422. The amplification unit 1411 may amplify power, which is acquired from a power providing unit (not illustrated) by a preset gain, and may deliver the amplified power to the resonance unit. The multiple resonance units 1421 and 1422 may share the amplification unit 1411. Specifically, the first resonance unit 1421 may receive power from the amplification unit 1411, and may transmit the received power to a first power reception unit 1431. Also, the second resonance unit 1422 may receive power from the amplification unit 1411, and may transmit the received power to a second power reception unit 1441. The first power reception unit 1431 may receive power, and may deliver the received power to a first load unit 1432. The second power reception unit 1441 may receive power, and may deliver the received power to a second load unit 1442.

In various embodiments of the present invention, the control unit 1412 may determine a power reception unit, to which the wireless power transmitter is to transmit wireless power, on the basis of information of a wireless power receiver. When the power reception unit has been determined, the control unit 1412 may adjust power provided to the determined power reception unit. In an embodiment of the present invention, the control unit 1412 may adjust power, which is output from a power providing unit (not illustrated), according to a class of the determined power reception unit. Alternatively, the control unit 1412 may also adjust a gain of the amplification unit 1411, according to an appropriate voltage of the power reception unit.

Figure 15:
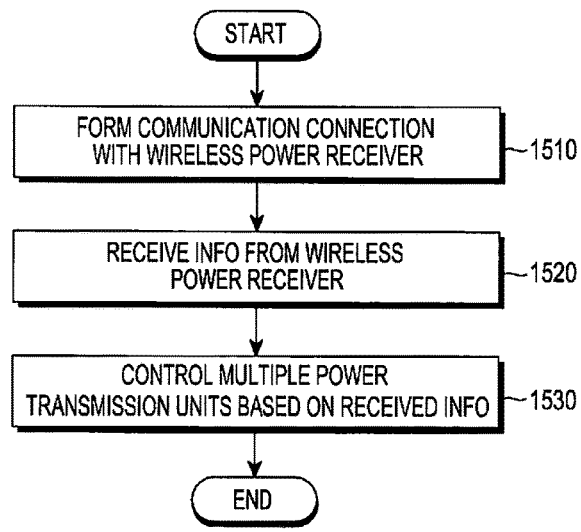
FIG. 15 is a flowchart illustrating a control method of a wireless power transmitter according to various embodiments of the present invention.

FIG. 15 is a flowchart illustrating a control method of a wireless power transmitter according to various embodiments of the present invention.

In operation 1510, the wireless power transmitter may form a communication connection with a wireless power receiver. A process in which the wireless power transmitter may form a communication connection with the wireless power receiver has been described in detail with reference to FIG. 4, and thus, a description thereof will be omitted herein.

In operation 1520, the wireless power transmitter may receive, from the wireless power receiver, information related to the wireless power receiver. In an embodiment of the present invention, the wireless power transmitter may receive information related to the wireless power receiver, from at least one of a PTU searching signal, a PRU static signal, and a PRU dynamic signal. For example, the wireless power transmitter may receive at least one piece of information among category information, voltage information, power information, current information, form information, and temperature information of the wireless power receiver, from at least one of a PTU searching signal, a PRU static signal, and a PRU dynamic signal. Meanwhile, in various embodiments of the present invention, the wireless power transmitter may perform operation 1520 prior to operation 1510.

In operation 1530, the wireless power transmitter may control multiple power transmission units on the basis of the received information related to the wireless power receiver. In an embodiment of the present invention, the wireless power transmitter may determine a power transmission unit that is to transmit power to the wireless power receiver among the multiple power transmission units. In this case, the wireless power transmitter may not apply power to the remaining power transmission units except for the power transmission unit to transmit the power to the wireless power receiver. In another embodiment of the present invention, the wireless power transmitter may determine at least one of a power amount, a current value, and a voltage value which are applied to each of the multiple power transmission units. For example, when the wireless power transmitter transmits power to multiple wireless power receivers, the wireless power transmitter may use the multiple power transmission units. The wireless power transmitter may determine at least one of a power amount, a current value, and a voltage value which are applied to the multiple power transmission units.

Figure 16A:
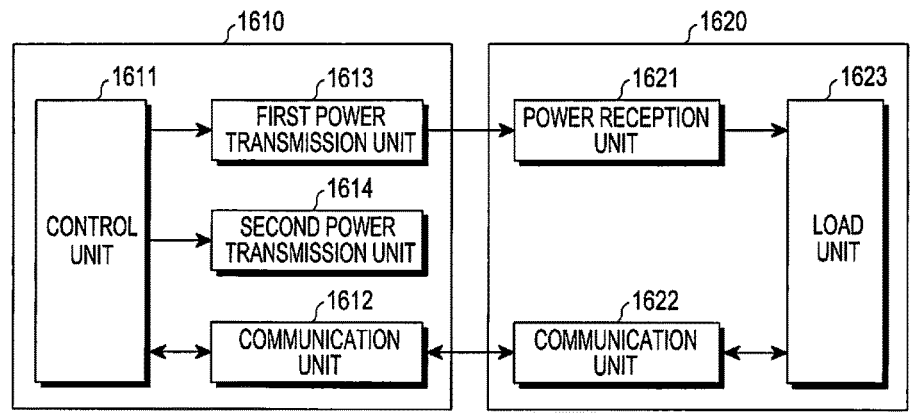
FIGS. 16A to 16C are block diagrams illustrating a wireless power transmission/reception system according to various embodiments of the present invention.
Figure 16B:
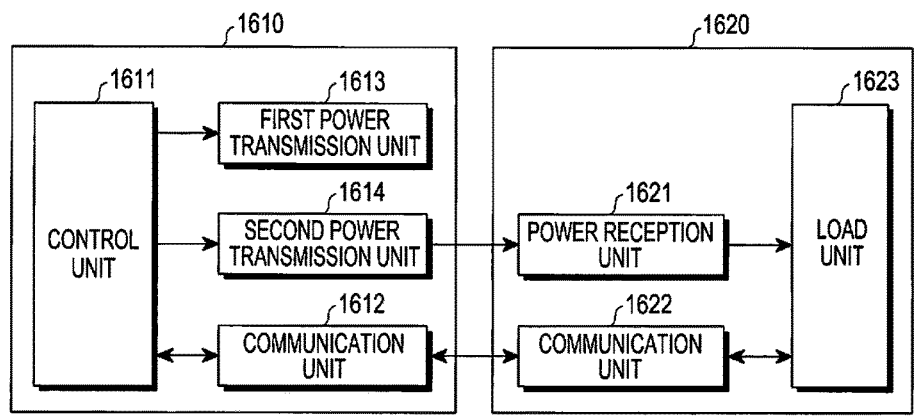
Figure 16C:
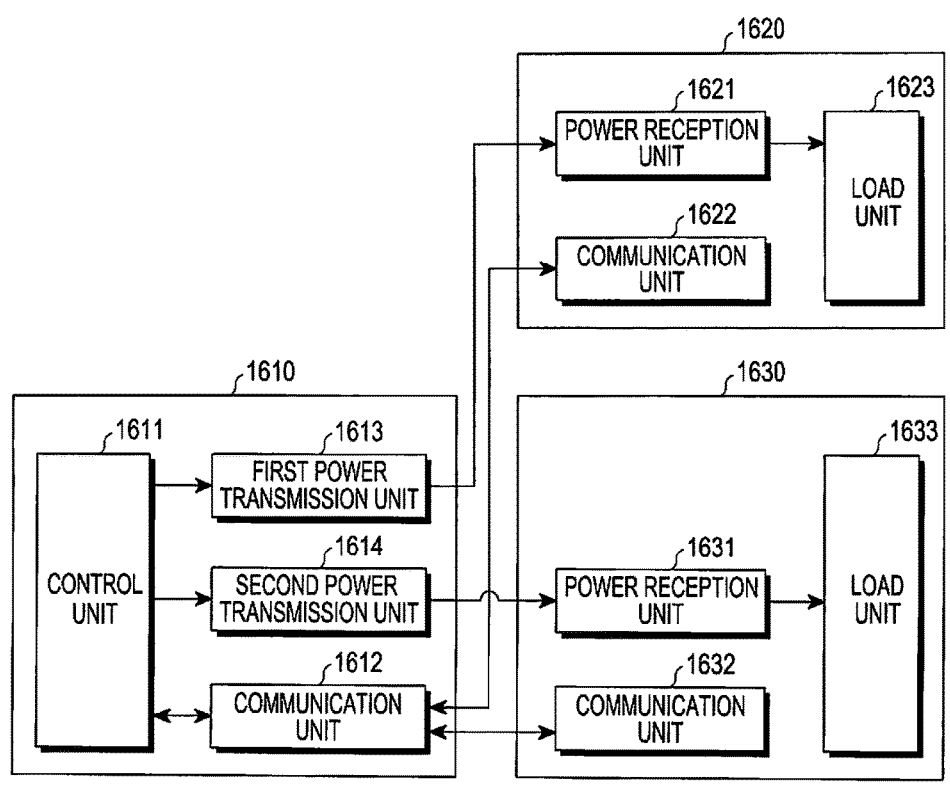

FIGS. 16A to 16C are block diagrams illustrating a wireless power transmission/reception system according to various embodiments of the present invention.

Referring to FIG. 16A, a wireless power transmitter 1610 may include a control unit 1611, a communication unit 1612, a first power transmission unit 1613, and a second power transmission unit 1614. A wireless power receiver 1620 may include a power reception unit 1621, a communication unit 1622, and a load unit 1623.

The communication unit 1612 of the wireless power transmitter 1610 may communicate with the communication unit 1622 of the wireless power receiver 1620. For example, the communication unit 1612 may receive, from the communication unit 1622, information related to the wireless power receiver. Here, the information related to the wireless power receiver may include at least one piece of information among category information, voltage information, power information, current information, form information, and temperature information of the wireless power receiver. In an embodiment of the present invention, the communication unit 1612 may communicate with the communication unit 1622 on the basis of a Bluetooth low energy scheme. In this case, the communication unit 1612 may receive at least one of a PTU searching signal, a PRU static signal, and a PRU dynamic signal. The information related to the wireless power receiver may be included in at least one of the PTU searching signal, the PRU static signal, and the PRU dynamic signal. The wireless power transmitter may acquire the information related to the wireless power receiver, from the received signal. The control unit 1611 may control at least one of the first power transmission unit 1613 and the second power transmission unit 1614 on the basis of the received information related to the wireless power receiver.

In an embodiment of FIG. 16A, the control unit 1611 may determine that the first power transmission unit 1613 is a power transmission unit that is to transmit power, on the basis of the related information of the wireless power receiver 1620. For example, the control unit 1611 may determine the first power transmission unit 1613 on the basis of at least one piece of information among category information, voltage information, power information, current information, form information, and temperature information of the wireless power receiver 1620.

The power reception unit 1621 of the wireless power receiver 1620 may receive wireless power from the first power transmission unit 1613. The power reception unit 1621 may process the received wireless power and may store the processed wireless power in the load unit 1623.

In various embodiments of the present invention, the communication unit 1622 may transmit, to communication unit 1612, updated information related to the wireless power receiver. The control unit 1611 may control at least one of the first power transmission unit 1613, and the second power transmission unit 1614 on the basis of the updated information related to the wireless power receiver. For example, consideration is given to a case where the temperature of the wireless power receiver rises from t1 to t2. The control unit 1611 may determine that the first power transmission unit 1613 is a power transmission unit that is to transmit power, in response to t1. Then, the control unit 1611 may determine that the second power transmission unit 1614 is a power transmission unit that is to transmit power, in response to t2. Specifically, the control unit 1611 may change a power transmission unit to transmit power. As described above, the embodiment related to the temperature has been described. However, in various embodiments of the present invention, the control unit 1611 may control at least one of the first power transmission unit 1613 and the second power transmission unit 1614 on the basis of at least one piece of information among voltage information, power information, and current information of the wireless power receiver 1620.

FIG. 16B illustrates an embodiment of a case where the second power transmission unit 1614 is determined as a power transmission unit to transmit power. The communication unit 1612 may receive, from a communication unit 1632, information related to the wireless power receiver. The control unit 1611 of the wireless power transmitter 1610 may determine that, for example, the second power transmission unit 1614 is a power transmission unit to transmit power, on the basis of the received information related to the wireless power receiver. In this case, the related information of a wireless power receiver 1630 may be different from that of the wireless power receiver 1620, and accordingly, the control unit 1611 may determine that the second power transmission unit 1614 is a power transmission unit to transmit power. A power reception unit 1631 may receive wireless power from the second power transmission unit 1614, and the received wireless power may be stored in a load unit 1633.

FIG. 16C illustrates an embodiment of a case where the wireless power receiver 1620 and the wireless power receiver 1630 receive wireless power from the wireless power transmitter 1610. The communication unit 1612 may receive, from the communication unit 1622, information related to the wireless power receiver 1620, and may receive, from the communication unit 1632, information related to the wireless power receiver 1630. The control unit 1611 may control the first power transmission unit 1613 and the second power transmission unit 1614 on the basis of the received information related to the wireless power receiver 1620 and the received information related to the wireless power receiver 1630. For example, the control unit 1611 may control power applied to each of the first power transmission unit 1613 and the second power transmission unit 1614. Meanwhile, the determination, by the control unit 1611, of both the first power transmission unit 1613 and the second power transmission unit 1614 as power transmission units to transmit power is only an example. When it is determined that one of the first power transmission unit 1613 and the second power transmission unit 1614 is capable of transmitting power to the both wireless power receivers 1620 and 1630, the control unit 1611 may perform a control operation for transmitting power to the both wireless power receivers 1620 and 1630 by using one power transmission unit.

Figure 17:
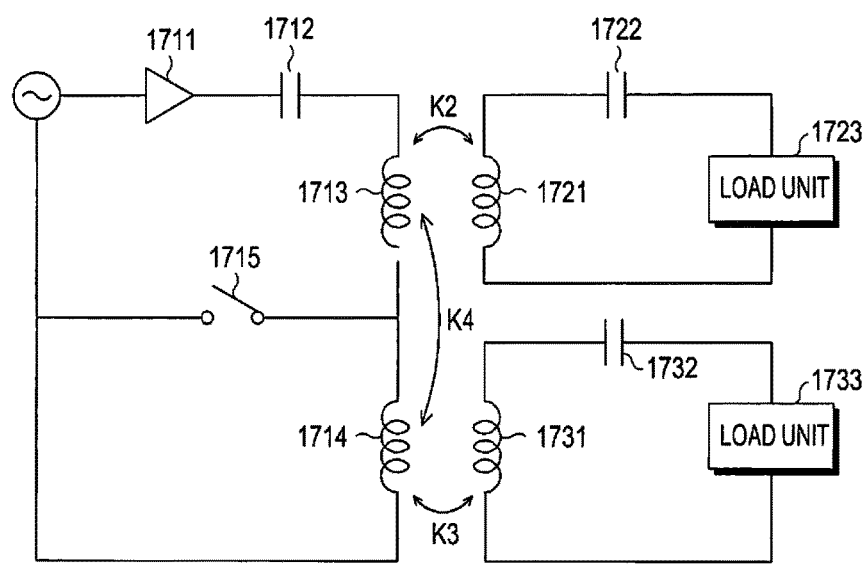
FIG. 17 is a circuit diagram illustrating a wireless power transmission/reception system according to various embodiments of the present invention.

FIG. 17 is a circuit diagram illustrating a wireless power transmission/reception system according to various embodiments of the present invention.

As illustrated in FIG. 17, a wireless power transmitter may include an amplifier 1711, a first capacitor 1712, a first coil 1713, a second coil 1714, and a switch 1715. A first wireless power receiver may include a third coil 1721, a second capacitor 1722, and a first load unit 1723. A second wireless power receiver may include a fourth coil 1731, a third capacitor 1732, and a second load unit 1733.

The first coil 1713 may form an inductive coupling with the third coil 1721 with respect to a coefficient K2, the second coil 1714 may form an inductive coupling with the fourth coil 1731 with respect to a coefficient K3, and the first coil 1713 may form an inductive coupling with the second coil 1714 with respect to a coefficient K4. In an embodiment of the present invention, the second coil 1714 may correspond to a master power transmission unit, and K2 may be larger than K3.

In various embodiments of the present invention, the first coil 1713 and the second coil 1714 may be connected in series to each other. Meanwhile, the wireless power transmitter may determine whether the first coil 1713 is to be used or both the first coil 1713 and the second coil 1714 are to be used, on the basis of a result of performing communication. For example, when it is determined that only the first wireless power receiver is placed, the wireless power transmitter may use only the first coil 1713. Also, when it is determined that the first wireless power receiver and the second wireless power receiver are placed, the wireless power transmitter may use both the first coil 1713 and the second coil 1714. The wireless power transmitter may control on/off of the switch 1715 on the basis of a result of determining a coil to be used. The wireless power transmitter may control the switch 1715 to be in an on-state when the first coil 1713 is used, and may control the switch 1715 to be in an off-state when the first coil 1713 and the second coil 1714 are used. Particularly, when the first coil 1713 and the second coil 1714 are used, the wireless power transmitter may control a voltage applied to each of the first coil 1713 and the second coil 1714, or the amount of power transmitted by each of the first coil 1713 and the second coil 1714. For example, a coupling coefficient may be proportional to an overlap ratio of the wireless power transmitter and the wireless power receiver. In an embodiment of the present invention, the overlap ratio may be a ratio of an overlap area to an entire area. The wireless power transmitter may distribute power by adjusting the coupling coefficient.

Hereinabove, although the exemplary embodiments of the present invention have been shown and described, it goes without saying that those having ordinary knowledge in the technical field, to which the present invention pertains, will appreciate that various changes and modifications may be made to the exemplary embodiments of the present invention without departing from the technical spirit and scope of the present invention. Therefore, various modified implementations can be made without departing from the subject matter of the present invention claimed in the appended claims, and the modified implementations should not be construed separately from the technical idea or concept of the present invention.

The invention claimed is:

1. A control method of a wireless power transmitter for transmitting wireless power to at least one wireless power receiver, the control method comprising:
   receiving information related to the at least one wireless power receiver, from each of the at least one wireless power receiver; and
   controlling each of multiple power transmission units included in the wireless power transmitter based on the information related to the at least one wireless power receiver,
   wherein the multiple power transmission units are attachable/detachable and are connected by wire or wirelessly to the wireless power transmitter.

2. The control method as claimed in claim 1, wherein the information related to the at least one wireless power receiver comprises at least one of category information, voltage information, power information, current information, form information, and temperature information of the at least one wireless power receiver.

3. The control method as claimed in claim 1, wherein the controlling of each of the multiple power transmission units comprises determining a first power transmission unit to transmit power among the multiple power transmission units, based on the category information of the at least one wireless power receiver.

4. The control method as claimed in claim 3, wherein the determining of the first power transmission unit comprises determining that a power transmission unit of a lowest class from among the power transmission units capable of transmitting power in response to the category information of the at least one wireless power receiver is the first power transmission unit.

5. The control method as claimed in claim 1, wherein the controlling of each of the multiple power transmission units comprises distributing power to be applied to the multiple power transmission units.

6. The control method as claimed in claim 5, wherein the controlling of each of the multiple power transmission units comprises distributing power to be applied to the multiple power transmission units in response to the category information of the at least one wireless power receiver.

7. The control method as claimed in claim 1, further comprising:
   receiving updated related information from the at least one wireless power receiver; and
   controlling each of the multiple power transmission units included in the wireless power transmitter based on the updated related information.

8. A wireless power transmitter for transmitting wireless power to at least one wireless power receiver, the wireless power transmitter comprising:
   multiple power transmission units that are attachable/detachable and are connected by wire or wirelessly to the wireless power transmitter;
   a communication unit that receives information related to the at least one wireless power receiver, from each of the at least one wireless power receiver; and
   a control unit that controls each of the multiple power transmission units based on the information related to the at least one wireless power receiver.

9. The wireless power transmitter as claimed in claim 8, wherein the information related to the at least one wireless power receiver comprises at least one of category information, voltage information, power information, current information, form information, and temperature information of the at least one wireless power receiver.

10. The wireless power transmitter as claimed in claim 8, wherein the control unit determines a first power transmission unit to transmit power among the multiple power transmission units, based on the category information of the at least one wireless power receiver.

11. The wireless power transmitter as claimed in claim 10, wherein the control unit determines that a power transmission unit of a lowest class from among the power transmission units capable of transmitting power in response to the category information of the at least one wireless power receiver is the first power transmission unit.

12. The wireless power transmitter as claimed in claim 8, wherein the control unit distributes power to be applied to the multiple power transmission units.

13. The wireless power transmitter as claimed in claim 12, wherein the control unit distributes power to be applied to the multiple power transmission units in response to the category information of the at least one wireless power receiver.

14. The wireless power transmitter as claimed in claim 8, wherein the communication unit receives updated related information from the at least one wireless power receiver, and the control unit controls each of the multiple power transmission units included in the wireless power transmitter based on the updated related information.

15. The wireless power transmitter as claimed in claim 8, wherein the multiple power transmission units are connected to each other in series or in parallel.

16. The wireless power transmitter as claimed in claim 15, further comprising, when the multiple power transmission units are connected in series to each other, a switch of which one terminal is connected to a node between the multiple power transmission units, and that is connected in parallel to the multiple power transmission units.

17. The wireless power transmitter as claimed in claim 8, wherein the multiple power transmission units comprise resonators included in different classes, respectively.

* * * * *